US009152356B2

(12) United States Patent
Oonami

(10) Patent No.: US 9,152,356 B2
(45) Date of Patent: Oct. 6, 2015

(54) INFORMATION PROCESSING APPARATUS, FUNCTION SETUP METHOD, AND COMPUTER PROGRAM

(71) Applicant: Oki Data Corporation, Tokyo (JP)

(72) Inventor: Ryoichi Oonami, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/200,119

(22) Filed: Mar. 7, 2014

(65) Prior Publication Data
US 2014/0285843 A1  Sep. 25, 2014

(30) Foreign Application Priority Data
Mar. 21, 2013  (JP) ................................. 2013-058749

(51) Int. Cl.
*G06F 3/12*  (2006.01)
*H04N 1/00*  (2006.01)

(52) U.S. Cl.
CPC ............ *G06F 3/1205* (2013.01); *G06F 3/1253* (2013.01); *G06F 3/1255* (2013.01); *G06F 3/1285* (2013.01); *H04N 1/0048* (2013.01); *H04N 1/00413* (2013.01); *H04N 1/00437* (2013.01); *H04N 1/00482* (2013.01); *H04N 2201/0082* (2013.01)

(58) Field of Classification Search
USPC ........................................................ 358/1.15
See application file for complete search history.

(56) References Cited

U.S. PATENT DOCUMENTS

2010/0200882 A1*  8/2010  Kotani et al. .................... 257/98
2012/0224207 A1*  9/2012  Sueshige ...................... 358/1.13
2012/0268753 A1* 10/2012  Tokuda .......................... 358/1.2

FOREIGN PATENT DOCUMENTS

| JP | H09-198191 A | 7/1997 |
| JP | 2006-120087 A | 5/2006 |
| JP | 2006-140786 A | 6/2006 |
| JP | 2008-152674 A | 7/2008 |
| JP | 2010-244317 A | 10/2010 |

OTHER PUBLICATIONS

Hideji, Printer Driver, Oct. 28, 2010, Machnine Translating Japanese Patent Application Publication, JP2010244317, All Pages.*

* cited by examiner

*Primary Examiner* — Ngon Nguyen
(74) *Attorney, Agent, or Firm* — Marvin A. Motsenbocker; Mots Law, PLLC

(57) ABSTRACT

A function setup method of providing a user interface for setting various setup items related to a predetermined function, the method including: generating a setup screen in which display item groups corresponding respectively to the various setup items and each including display items are displayed in a list form; detecting an operation input instructing selection of one display item belonging to a certain one of the display item groups; changing a display state of the one display item to a setup effective state; accessing a data storage unit storing confliction information defining a conflicting relationship of setup values not allowed to be set simultaneously between the setup items, and finding a conflicting display item having the conflicting relationship with the one display item from the display item groups based on the confliction information; and changing the display state of the found conflicting display item to a setup disabled state.

22 Claims, 27 Drawing Sheets

Fig. 5

| SHEET SIZE | TRAY | PORTRAIT /LANDSCAPE | SHEET TYPE | SHEET THICKNESS | DUPLEX PRINTING |
|---|---|---|---|---|---|
| A4 | MPT | LANDSCAPE | PLAIN | THIN | NO |
| A5 | Tray1 | PORTRAIT | LABEL | NORMAL | YES |
| A6 | Tray2 | | GLOSSY | THICK | |
| B4 | Tray3 | | ROUGH | VERY THICK | |
| B5 | Tray4 | | RECYCLED | | |
| B6 | Tray5 | | | | |
| POSTCARD | | | | | |
| ENVELOPE | | | | | |

SET   RESET

|  | MPT | Tray1 | Tray2 | Tray3 | Tray4 | Tray5 | LAND-SCAPE | PORT-RAIT |
|---|---|---|---|---|---|---|---|---|
| A4 | O | O | O | O | O | O | O | O |
| A5 | O | O | O | O | O | O | O | O |
| A6 | O | O | × | × | × | × | O | × |
| B4 | O | O | O | O | O | O | × | O |
| ENV | O | × | × | × | × | × | O | × |
| ⋮ | ⋮ | ⋮ | ⋮ | ⋮ | ⋮ | ⋮ | ⋮ | ⋮ |

Fig. 8

|  |  | DUPLEX PRINTING |
|---|---|---|
| PLAIN PAPER | MPT | O |
|  | Tray1~Tray5 | O |
| LABEL PAPER | MPT | O |
|  | Tray1~Tray5 | × |
| GLOSSY PAPER | MPT | O |
|  | Tray1~Tray5 | × |
| ROUGH PAPER | MPT | O |
|  | Tray1~Tray5 | O |
| RECYCLED PAPER | MPT | O |
|  | Tray1~Tray5 | O |

| SET | RESET |

| SHEET SIZE | TRAY | PORTRAIT /LANDSCAPE | SHEET TYPE | SHEET THICKNESS | DUPLEX PRINTING |
|---|---|---|---|---|---|
| A4 | MPT | LANDSCAPE | PLAIN | THIN | NO |
| A5 | Tray1 | PORTRAIT | LABEL | NORMAL | YES |
| A6 | Tray2 | | GLOSSY | THICK | |
| B4 | Tray3 | | ROUGH | VERY THICK | |
| B5 | Tray4 | | RECYCLED | | |
| B6 | Tray5 | | | | |
| POSTCARD | | | | | |
| ENVELOPE | | | | | |

| SET | RESET |

| SHEET SIZE | TRAY | PORTRAIT /LANDSCAPE | SHEET TYPE | SHEET THICKNESS | DUPLEX PRINTING |
|---|---|---|---|---|---|
| A4 | MPT | LANDSCAPE | PLAIN | THIN | NO |
| A5 | Tray1 | PORTRAIT | LABEL | NORMAL | YES |
| A6 | Tray2 | | GLOSSY | THICK | |
| B4 | Tray3 | | ROUGH | VERY THICK | |
| B5 | Tray4 | | RECYCLED | | |
| B6 | Tray5 | | | | |
| POSTCARD | | | | | |
| ENVELOPE | | | | | |

INFORMATION PROCESSING APPARATUS, FUNCTION SETUP METHOD, AND COMPUTER PROGRAM

CROSS REFERENCE TO RELATED APPLICATIONS

This application claims priority based on 35 USC 119 from prior Japanese Patent Application No. 2013-058749 filed on Mar. 21, 2013, entitled "INFORMATION PROCESSING APPARATUS, FUNCTION SETUP METHOD, AND COMPUTER PROGRAM", the entire contents of which are incorporated herein by reference.

BACKGROUND OF THE INVENTION

1. Field of the Invention

This disclosure relates to a user interface technique for setting various setup items.

2. Description of Related Art

Recently, electronic devices such as printers and facsimile machines have various functions and the number of items to be set for the functions by a user tends to increase. However, the user tends to avoid a complex and cumbersome setup method for many setup items. Accordingly, there is a strong desire for a user interface which allows the user to efficiently and easily set many setup items.

For example, Patent Document 1 (Japanese Patent Application Publication No. 2006-140786 (paragraphs 0027 to 0034, FIGS. 2 and 3, and the like) discloses a digital camera which displays, on a setup screen, information indicating conflicting relationships among setup items of a certain image capturing condition. Since a photographer using this digital camera can easily grasp the conflicting relationships through the setup screen, the photographer can efficiently perform a setup operation of the image capturing condition.

SUMMARY OF THE INVENTION

However, in the method disclosed in Patent Document 1 described above, in a case where the number of combinations of setup items is large and the conflicting relationships among the setup items are complex, it is difficult to easily and efficiently perform setup desired by the photographer.

An object of one aspect of the invention is to provide an information processing apparatus, a function setup method, and a computer program which enable easy and efficient setup of various setup items.

A first aspect of the invention is an information processing apparatus configured to provide a user interface for setting various setup items related to a predetermined function. The information processing apparatus comprises: a display controller configured to generate a setup screen on which display item groups corresponding respectively to the various setup items and each including display items are displayed in a list form; a display unit configured to display the setup screen; a setup controller configured to detect an operation input instructing a selection of one display item belonging to a certain one of the display item groups; and a data storage unit configured to store conflict information defining a conflicting relationship of setup values not allowed to be set simultaneously between the various setup items. Upon detection of the operation input, the setup controller finds a conflicting display item having the conflicting relationship with the one display item from the display item groups on the basis of the conflict information. The display controller changes a display state of the one display item to a setup effective state and changes the display state of the conflicting display item found by the setup controller to a setup disabled state.

A second aspect of the invention is a function setup method of providing a user interface for setting various setup items related to a predetermined function. The function setup method includes: generating a setup screen in which display item groups corresponding respectively to the various setup items and each including display items are displayed in a list form; detecting an operation input instructing a selection of one display item belonging to a certain one of the display item groups; changing a display state of the one display item to a setup effective state; accessing a data storage unit storing conflict information defining a conflicting relationship of setup values not allowed to be set simultaneously between the setup items, and finding a conflicting display item having the conflicting relationship with the one display item from the display item groups on the basis of the conflict information; and changing the display state of the found conflicting display item to a setup disabled state.

A third aspect of the invention is a computer program configured to provide a user interface by causing a processor to execute a function setup process for setting various setup items related to a predetermined function. The computer program is executed by the processor by being read from a computer readable recoding medium. The function setup process includes: a process of generating a setup screen in which display item groups corresponding respectively to the various setup items and each including display items are displayed in a list form; a process of detecting an operation input instructing selection of one display item belonging to a certain one of the display item groups; a process of changing a display state of the one display item to a setup effective state; a process of accessing a data storage unit storing conflict information defining a conflicting relationship of setup values not allowed to be set simultaneously between the various setup items, and finding a conflicting display item having the conflicting relationship with the one display item from the display item groups on the basis of the conflict information; and a process of changing the display state of the found conflicting display item to a setup disabled state.

According to the aforementioned aspects of the invention, the user can perform an easy and efficient setup for various setup items.

BRIEF DESCRIPTION OF THE DRAWINGS

FIG. 5 is a view illustrating an example of a setup screen.

FIG. 7 is a view illustrating an example of conflicting information in the form of a table.

FIG. 8 is a view illustrating another example of the conflicting information in the form of a table.

FIGS. 26A and 26B are views illustrating a setup screen displayed before and after an update performed when the user selects "label paper" in the setup screen of FIG. 16.

DETAILED DESCRIPTION OF EMBODIMENTS

Figure 1:
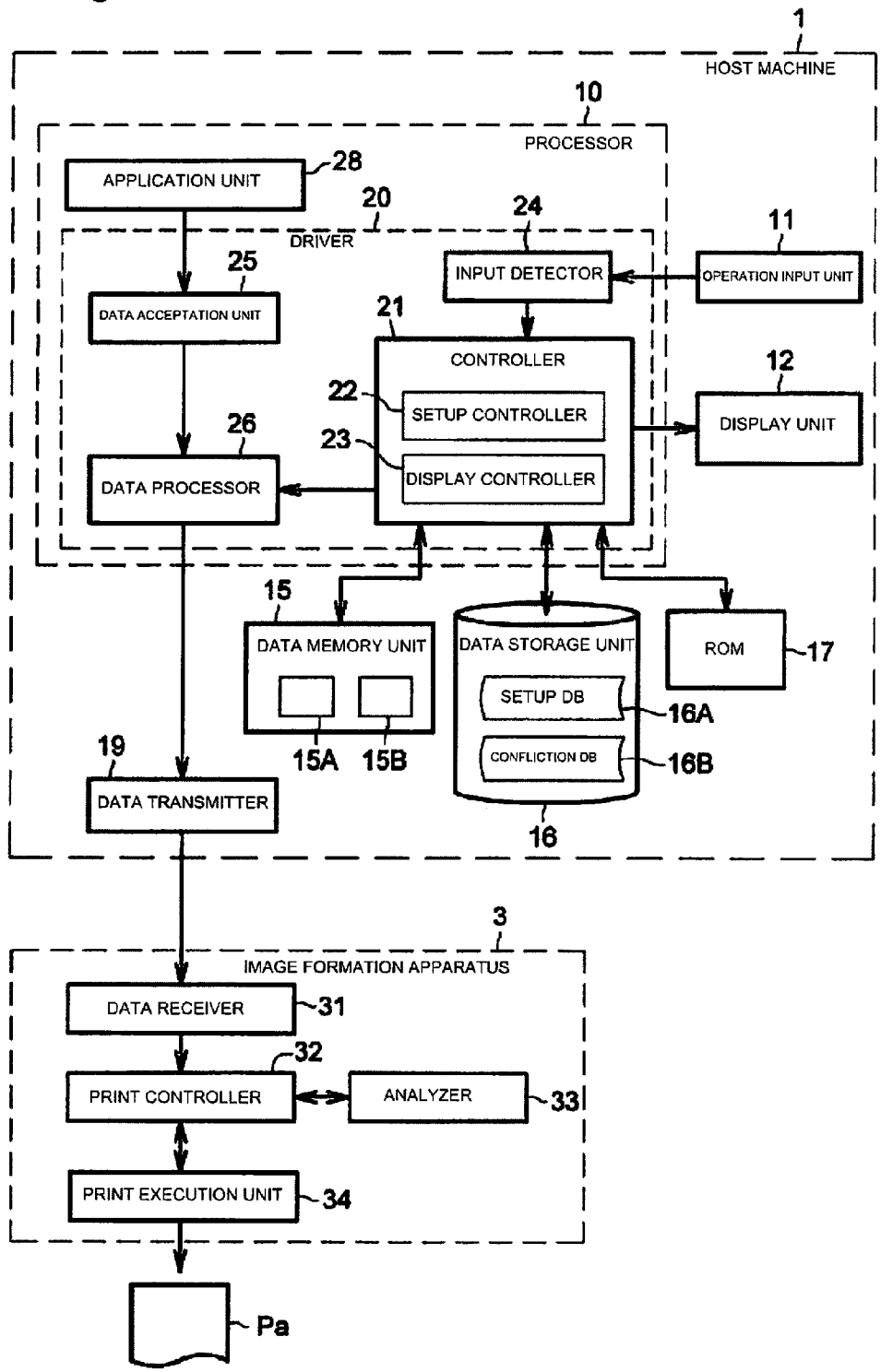
FIG. 1 is a block diagram illustrating a schematic configuration of a print system including: a host machine which is an information processing apparatus in Embodiment 1 of the invention; and an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Various embodiments of the invention are described below with reference to the drawings.

Embodiment 1

FIG. 1 is a block diagram illustrating a schematic configuration of a print system including: host machine 1 which is an information processing apparatus in Embodiment 1 of the invention; and image formation apparatus 3.

As illustrated in FIG. 1, host machine 1 includes: processor 10 configured to execute a function setup process for setting various setup items related to operation conditions of functions of image formation apparatus 3; operation input unit 11 configured to receive an operation input made by an user; display unit 12 configured to display a setup screen; data memory unit 15 configured to store data generated by processor 10; data storage unit 16 configured to store databases referred to in the function setup process; ROM (Read Only Memory) 17 configured to store a computer program implementing the function setup process; and data transmitter 19 configured to transmit an output of processor 10 to external image formation apparatus 3.

Processor 10 includes a CPU (Central Processing Unit) and/or a MPU (Microprocessor Unit) and executes the function setup process of the embodiment by loading the computer program from ROM 17 and executing it. In a case where host machine 1 is formed of a personal computer, processor 10 can causes an OS (Operating System) to operate and execute various computer programs on the OS. Note that a recording medium storing the computer program is not limited to ROM 17. For example, instead of ROM 17, a recording medium such as a HDD (Hard Disk Drive) or a flash memory can be used.

Data storage unit 16 stores setup database 16A and confliction database 16B which are referred to in the function setup process. Databases 16A, 16B are described in detail later. For example, a non-volatile recording medium such as a HDD or a flash memory can be used as data storage unit 16.

Data memory unit 15 stores setup state data 15A indicating a current setup state of each of the setup items and order list data 15B which are to be described later. For example, a memory capable of operating at a high speed such as a SDRAM can be used as data memory unit 15. However, data memory unit 15 is not particularly limited to this.

Operation input unit 11 is, for example, an input device including input keys and input buttons. The user can operate operation input unit 11 to input information into processor 10. Display unit 12 includes, for example, a display device such as a liquid crystal display panel or an organic EL panel and has a function of displaying a setup screen supplied or specified by processor 10.

In a case where host machine 1 is formed of a PC (Personal Computer), operation input unit 11 can be formed of a keyboard and a pointing device. Moreover, operation input unit 11 can be achieved by providing a touch panel function to display unit 12. In this case, the user can input information by touching a region on a display screen of display unit 12 by his or her finger tip or with a pointing tool.

As illustrated in FIG. 1, processor 10 includes application unit 28 and driver 20. Processor 10 implements application unit 28 and driver 20 by loading the computer program from ROM 17 and executing it.

Application unit 28 generates data to be printed and requests driver 20 to print the generated data. Driver 20 has a function of generating print job data to be supplied to image formation apparatus 3, in response to the print request from application unit 28.

Driver 20 includes: controller 21; input detector 24 configured to detect the operation input from operation input unit 11; data acceptation unit 25 configured to accept the print request from application unit 28; and data processor 26 configured to generate the print job data on the basis of a setup condition specified by controller 21, in response to the print request. Controller 21 includes setup controller 22 and display controller 23. Functions of setup controller 22 and display controller 23 are described later.

Meanwhile, image formation apparatus 3 includes: data receiver 31 configured to receive the print job data transmitted from host machine 1; analyzer 33 configured to analyze print setup information (for example, information specifying a sheet size and a tray) included in the print job data; print controller 32 configured to generate print data on the basis of an analysis result of analyzer 33; and print execution unit 34 configured to form a print image shown by the print data on printing medium Pa. In this embodiment, an electrographic print device is used as print execution unit 34. Note that print execution unit 34 is not limited to the print device operating in the electrographic method and a print device operating in a different print method (such as an inkjet method) may be used.

Figure 2:
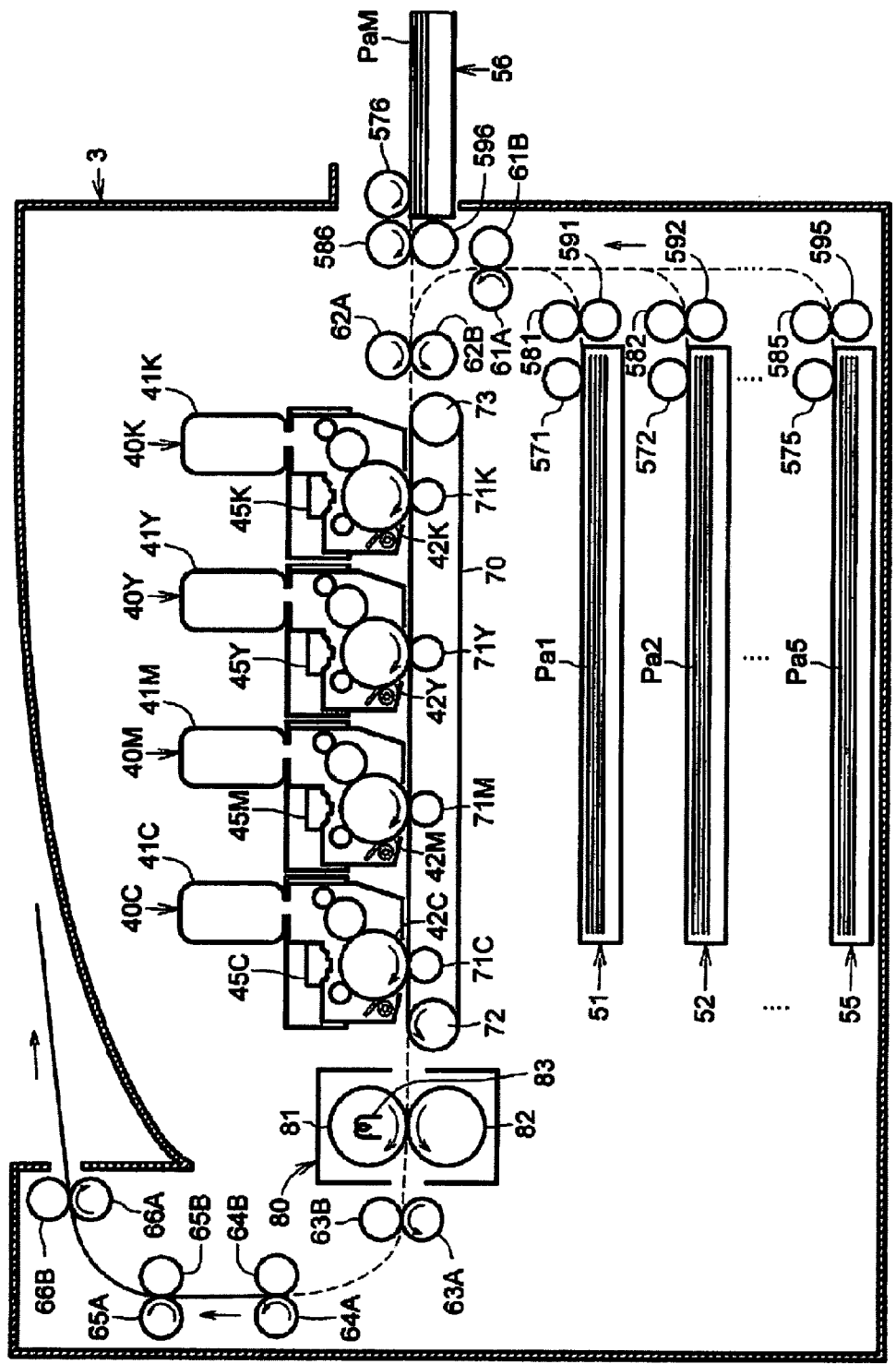
FIG. 2 is a view schematically illustrating a configuration example of a print execution unit in the image formation apparatus used in the embodiment.

FIG. 2 is a view schematically illustrating a configuration example of print execution unit 34 in image formation apparatus 3 used in the embodiment. Image formation apparatus 3 has a function of forming a color image by superimposing developer images of four colors of black (K), yellow (Y), magenta (M), and cyan (C) on a sheet of printing medium in a direct transfer method.

As illustrated in FIG. 2, image formation apparatus 3 includes: image formation units 40K, 40Y, 40M, 40C configured to form the developer images of black (K), yellow (Y), magenta (M), and cyan (C), respectively; five trays 51, 52, ..., 55 capable of housing sheets of printing media Pa1, Pa2, ..., Pa5, respectively, in a stacked state; MPT (Multi-Purpose Tray) 56 capable of housing printing medium PaM; transfer belt 70 configured to convey the medium to be printed on, which is supplied from any one of trays 51 to 55 and MPT 56, with the medium placed thereon; and fuser 80.

Image formation units 40K, 40Y, 40M, 40C includes therein photosensitive drums 42K, 42Y, 42M, 42C which are image carriers configured to hold developer images of K, Y, M, and C on surfaces thereof, respectively.

Moreover, image formation apparatus 3 includes drive roller 72 configured to drive transfer belt 70 and tension roller 73. Transfer belt 70 is an endless elastic belt made of, for example, resin material such as polyimide resin. Transfer belt 70 is provided (extended) between drive roller 72 and tension roller 73 in a tensioned state.

As illustrated in FIG. 2, pickup rollers 571 to 575, feed rollers 581 to 585, and retard rollers 591 to 595 are provided near trays 51 to 55. Pickup rollers 571 to 575 rotate clockwise to take out printing media Pa1 to Pa 5 from trays 51 to 55. Pairs of feed rollers 581 to 585 and retard rollers 591 to 595 sandwich therebetween printing media Pa1 to Pa 5 which are taken out from trays 51 to 55, and send out printing media Pa1 to Pa 5 to a conveyance path one by one. Conveyance rollers 61A, 61B, 62A, 62B convey each of the printing media onto transfer belt 70.

Meanwhile, pickup roller 576, feed roller 586, and retard roller 596 are provided near MPT 56. Pickup roller 576 rotates counterclockwise to take out printing media PaM from MPT 56. Feed roller 586 and retard roller 596 can sandwich therebetween printing media PaM which are taken out from MPT 56, and send out printing media PaM one by one to the conveyance path. Conveyance rollers 62A, 62B convey each of printing medium PaM onto transfer belt 70.

Print controller 32 illustrated in FIG. 1 selects a tray out of trays 51 to 55 and MPT 56 which is specified in the print job data received by data receiver 31, and causes the printing medium in the selected tray to be conveyed to transfer belt 70.

Examples of printing media Pa1 to Pa 5 and PaM include sheet media such as plain paper, transfer paper, color paper (plain paper which is not white and which has a color such as black, blue, or red), synthetic paper, thick paper, a special sheet, a plastic film, and cloth.

Image formation units 40K, 40Y, 40M, 40C are disposed to face transfer belt 70 and are arranged in a row extending in a sending direction of transfer belt 70, i.e. the conveyance direction of the printing medium. Transfer rollers 71K, 71Y, 71M, 71C are disposed at positions facing photosensitive drums 42K, 42Y, 42M, 42C, respectively, with transfer belt 70 provided therebetween. Transfer rollers 71K, 71Y, 71M, 71C are members which transfer the developer images from the surfaces of photosensitive drums 42K, 42Y, 42M, 42C to the printing medium.

Fuser 80 has a function of fusing, to the printing medium, the developer images on the printing medium which are supplied from transfer belt 70. As illustrated in FIG. 2, fuser 80 includes cylindrical heating roller 81 configured to rotate clockwise and cylindrical pressure roller 82 configured to rotate counterclockwise. Heating roller 81 and pressure roller 82 are disposed to face each other. Heat source 83 such as a halogen lamp is provided inside heating roller 81. Heating roller 81 and pressure roller 82 can melt the developer images by applying heat and pressure to the printing medium t which is nipped (interposed and held) between heating roller 81 and pressure roller 82, and thereby fuse the developer images to the printing medium.

The printing medium sent out from fuser 80 is conveyed to discharge rollers 66A, 66B by conveyance rollers 63A, 63B, 64A, 64B, 65A, 65B. Then, discharge rollers 66A, 66B discharge the printing medium to a discharge tray from a discharge port of a case.

Next, configurations and operations of image formation units 40K, 40Y, 40M, 40C are described below with reference to FIG. 3.

Figure 3:
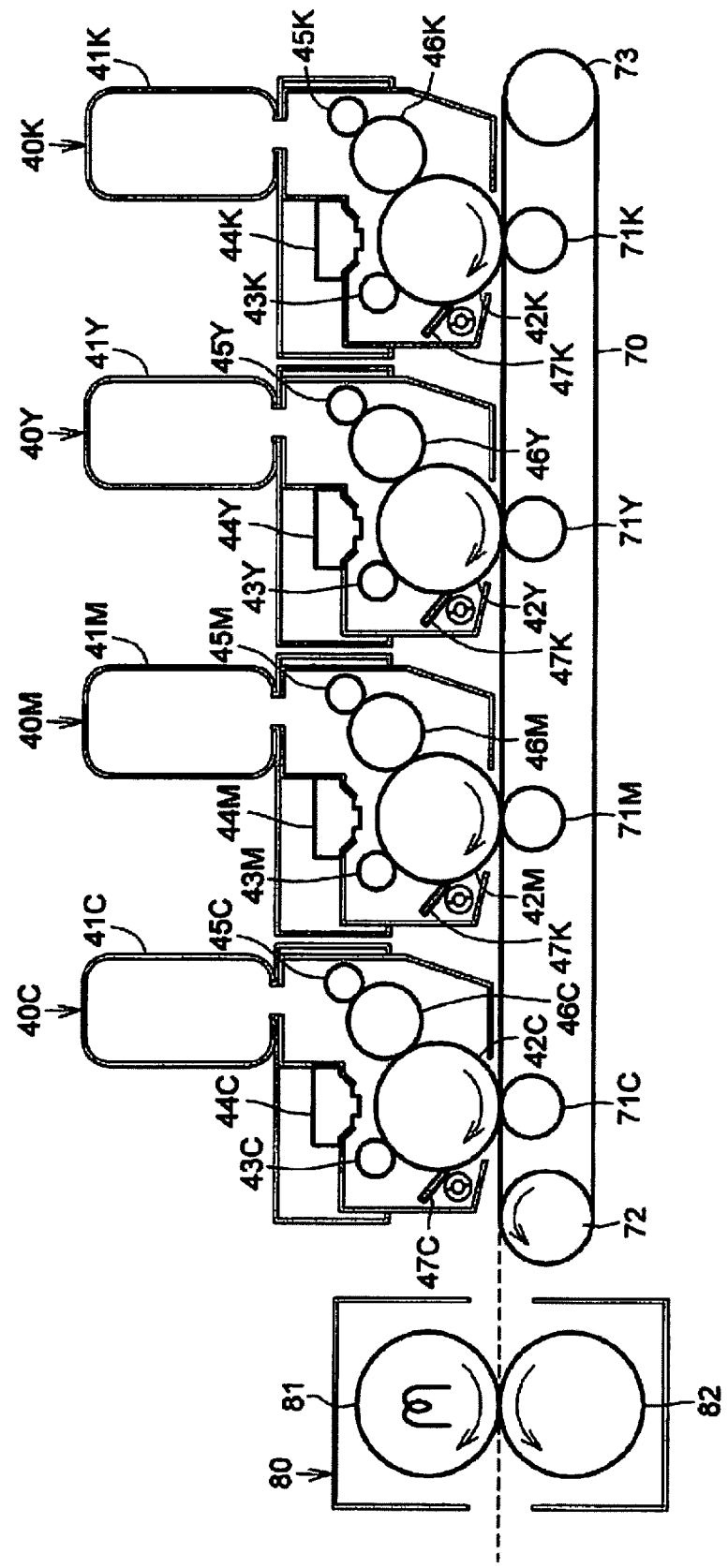
FIG. 3 is a schematic view illustrating a main portion of the image formation apparatus in FIG. 2 in an enlarged manner.

FIG. 3 is a schematic view illustrating a main portion of image formation apparatus 3 in FIG. 2 in an enlarged manner. As illustrated in FIG. 3, image formation units 40K, 40Y, 40M, 40C are disposed at positions facing transfer rollers 71K, 71Y, 71M, 71C, respectively, with transfer belt 70 provided therebetween. Photosensitive drums 42K, 42Y, 42M, 42C rotate counterclockwise.

Image formation unit 40K configured to form the black developer image includes: developer housing portion 41K configured to house a black developer; charge roller 43K configured to come in contact with a surface of photosensitive drum 42K and uniformly charge the surface; LED head (exposure unit) 44K configured to perform the exposure for forming an electrostatic latent image on the surface of rotating photosensitive drum 42K, the electrostatic latent image corresponding to an image to be printed; development roller 46K which is a developer carrier; supply roller 45K configured to supply the black developer to development roller 46K; and drum cleaning unit 47K configured to scrape off the developer remaining on photosensitive drum 42K. Note that, although not illustrated, the image formation unit 40K also includes a blade member which reduces the thickness of a developer layer on development roller 46K.

Other image formation units 40Y, 40M, 40C also have the same configuration as image formation unit 40K, except for the developer housed therein. Specifically, image formation unit 40Y configured to form the yellow developer image includes: developer housing portion 41Y configured to house a yellow developer; charge roller 43Y configured to come in contact with a surface of photosensitive drum 42Y and uniformly charge the surface; LED head (exposure unit) 44Y configured to perform the exposure for forming an electrostatic latent image on the surface of rotating photosensitive drum 42Y, the electrostatic latent image corresponding to the image to be printed; development roller 46Y which is a developer carrier; supply roller 45Y configured to supply the yellow developer to development roller 46Y; and drum cleaning unit 47Y configured to scrape off the developer remaining on photosensitive drum 42Y.

Moreover, image formation unit 40M configured to form the magenta developer image includes: developer housing portion 41M configured to house a magenta developer; charge roller 43M configured to come in contact with a surface of photosensitive drum 42M and uniformly charge the surface; LED head (exposure unit) 44M configured to perform the exposure for forming an electrostatic latent image on the surface of rotating photosensitive drum 42M, the electrostatic latent image corresponding to the image to be printed; development roller 46M which is a developer carrier; supply roller 45M configured to supply the magenta developer to development roller 46M; and drum cleaning unit 47M configured to scrape off the developer remaining on photosensitive drum 42M.

Furthermore, image formation unit 40C configured to form the cyan developer image includes: developer housing portion 41C configured to house a cyan developer; charge roller 43C configured to come in contact with a surface of photosensitive drum 42C and uniformly charge the surface; LED head (exposure unit) 44C configured to perform the exposure for forming an electrostatic latent image on the surface of rotating photosensitive drum 42C, the electrostatic latent image corresponding to the image to be printed; development roller 46C which is a developer carrier; supply roller 45C configured to supply the cyan developer to development roller 46C; and drum cleaning unit 47C configured to scrape off the developer remaining on photosensitive drum 42C.

Next, functions of driver 20 are described below.

Figure 4:
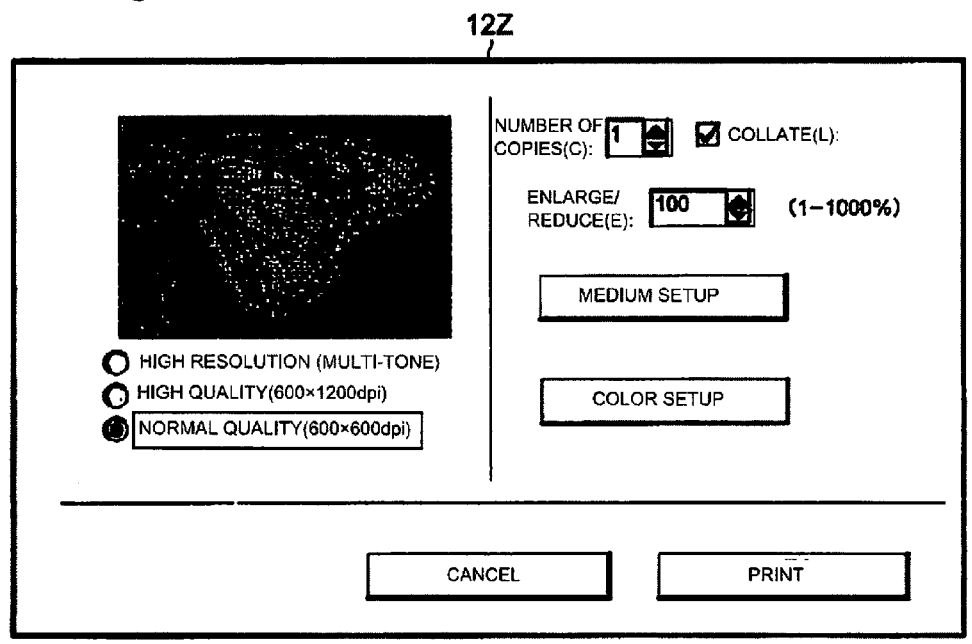
FIG. 4 is a view illustrating an example of a dialog screen.

When processor 10 activates driver 20 in response to the print request from application unit 28, display controller 23 of driver 20 displays, for example, dialog screen 12Z illustrated in FIG. 4 on display unit 12. Dialog screen 12Z includes display items such as a "print" button, a "cancel" button, a "medium setup" button, and a "color setup" button.

When the user operates operation input unit 11 and selects the "print" button of dialog screen 12Z, data processor 26 generates the print job data on the basis of the print request and supplies the print job data to image formation apparatus 3 via data transmitter 19. Note that, when the user selects the "cancel" button of dialog screen 12Z, dialog screen 12Z is closed.

Meanwhile, when the user operates operation input unit 11 and selects the "medium setup" button of dialog screen 12Z, controller 21 having detected this operation input starts a medium setup process. Specifically, display controller 23 generates a setup screen on which display item groups corresponding respectively to various setup items are displayed in a list form. FIG. 5 is a view illustrating an example of such setup screen 12D.

Setup screen 12D illustrated in FIG. 5 includes six display item groups corresponding respectively to six types of setup items of "sheet size", "paper feed tray", "portrait/landscape", "sheet type", "sheet thickness", and "duplex printing". The display item group corresponding to "sheet size" includes eight display items of "A4", "A5", "A6" "B4", "B5", "B6" "postcard", and "envelope". The user can select any one of these display items by operating operation input unit 11 and specify the size of the printing medium.

The display item group corresponding to "paper feed tray" includes six display items of "MPT", "Tray1", "Tray 2", "Tray 3", "Tray 4", and "Tray 5". These "MPT", "Tray1", "Tray 2", "Tray 3", "Tray 4", and "Tray 5" correspond respectively to MPT 56 and trays 51 to 55 described above. The user can select any one of the display items to specify one of MPT 56 and trays 51 to 55.

The display item group corresponding to "portrait/landscape" includes two display items of "landscape" and "portrait". The user can select either "landscape" or "portrait" by operating operation input unit 11 and specify the orientation of the printing medium which is placed in each of the trays.

The display item groups corresponding to "sheet type" includes five display items of "plain paper", "label paper", "glossy paper", "rough paper", and "recycled paper". The user can select any one of these display items by operating operation input unit 11 and select the type of the printing medium.

The display item group corresponding to "sheet thickness" includes four display items of "thin", "normal", "thick", and "very thick". The user can select any one of these display items to select the thickness of the printing medium.

Then, the display item group corresponding to "duplex printing" includes two display items of no and "yes". The user can select whether to perform duplex printing or not by selecting either "yes" or "no".

Setup values different from each other are assigned to the respective display items described above in advance. When the user selects one of the display items (hereafter, also referred to as "display cells") by operating operation input unit 11, setup controller 22 sets a variable of the setup item corresponding to the selected display cell to the setup value assigned thereto. For example, when the user selects the display cell of "normal paper" in setup screen 12D, the variable of the setup item of "sheet type" is set to the setup value assigned to "normal paper".

All of the display cells in setup screen 12D illustrated in FIG. 5 are displayed in an initial display state. As illustrated in FIG. 5, the display cells of "A4", "MPT", "landscape", "plain paper", "thin", and "no" whose backgrounds are hatched with halftone dots (or in aqua blue) are the display items selected in the initial setup (default). Moreover, the display cells whose backgrounds are white and are not hatched are the display cells corresponding to unset setup items. When the user selects a "set" button (display item of "set") in setup screen 12D in the initial display state, setup controller 22 sets variable values of the setup items of "sheet size", "paper feed tray", "portrait/landscape", "sheet type", "sheet thickness", and "duplex printing" to their respective initial setup values (default values) and reflects this setup in the print setup information.

Figure 6:
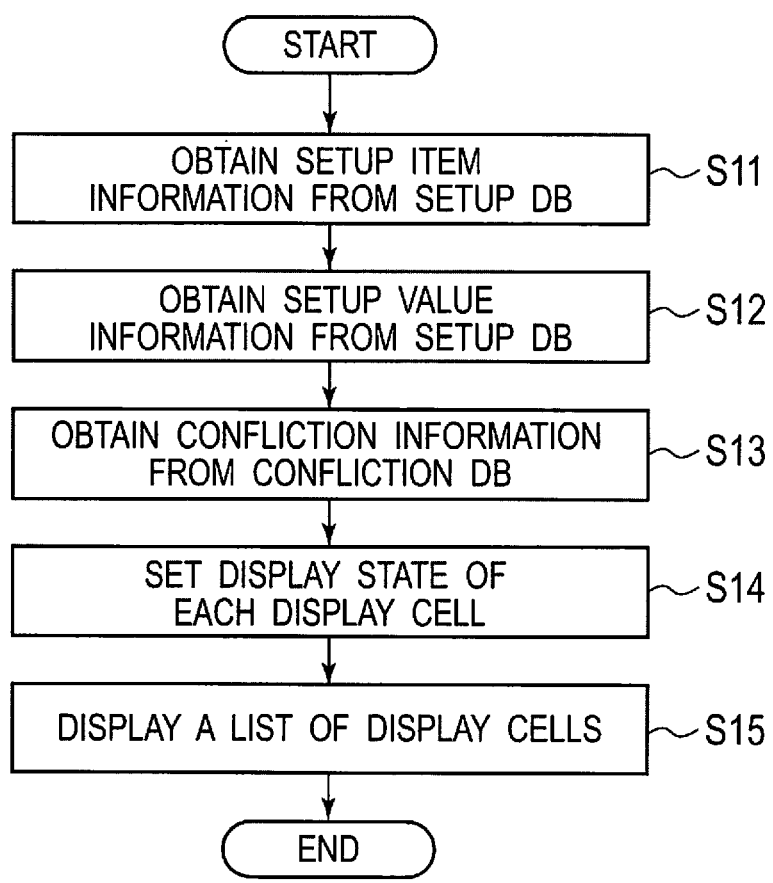
FIG. 6 is a flowchart schematically illustrating a procedure of a process of generating the setup screen illustrated in FIG. 5.

FIG. 6 is a flowchart schematically illustrating the procedure of a process for generating setup screen 12D in the initial display state which is illustrated in FIG. 5. As illustrated in FIG. 6, setup controller 22 refers to setup database 16A in data storage unit 16 to obtain setup item information (step S11) and setup value information (Step S12) and then refers to confliction database 16B to obtain confliction information (step S13). Thereafter, display controller 23 sets the display state of each of the display cells to the initial display state on the basis of the information obtained in steps S11 to S13 (step S14) and displays setup screen 12D illustrated in FIG. 5 on display unit 12 (step S15).

Here, the confliction information is information defining conflicting relationships of the setup values not allowed to be set simultaneously among the various setup items. FIGS. 7 and 8 are views each illustrating an example of the confliction information in the form of a table. In FIGS. 7 and 8, relationships of combinations of the setup values allowed to be set simultaneously (cases where there are no conflicting relationships) are each represented by the symbol of a circle while relationships of combinations of the setup values not allowed to be set simultaneously (cases where there are conflicting relationships) are each represented by the symbol of a cross. The conflict information obtained in step S13 in FIG. 6 is used in a selection process and a reselection process to be performed later.

Note that, also in the case where the user selects a "reset" button (display item of "reset"), display controller 23 executes the process illustrated in FIG. 6 and initializes setup screen 12D. At the same time, setup controller 22 resets the values of all of the setup items to their initial values and cancels the setup state.

Figure 9:
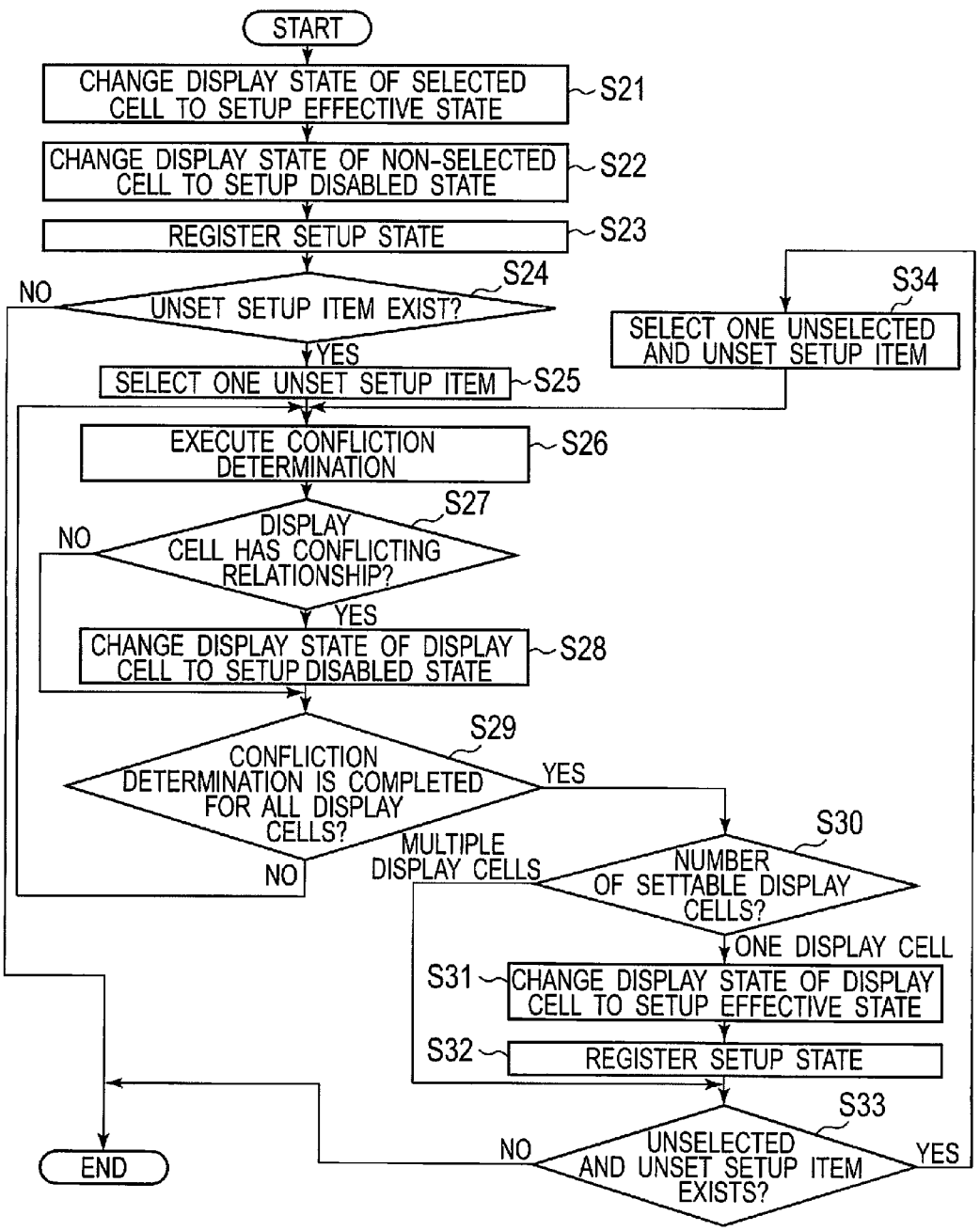
FIG. 9 is a flowchart schematically illustrating a procedure of a selection process in Embodiment 1.

When the user selects one of the display cells in setup screen 12D illustrated in FIG. 5, controller 21 having detected this operation input starts the selection process. FIG. 9 is a flowchart schematically illustrating a procedure of the selection process in Embodiment 1.

As illustrated in FIG. 9, first, display controller 23 changes the display state of the selected display cell (selected cell) from the initial display state to a setup effective state (for example, a display state where the background is yellow) (step S21), and changes the display states of non-selected display cells (non-selected cells) corresponding to the same setup item to a setup disabled state (for example, a display state where the background is gray) (step S22). Then, setup controller 22 registers the setup state of this setup item (step S23). Specifically, setup controller 22 sets the variable value of this setup item to the setup value assigned to the selected cell, reflects this setup in setup state data 15A, and reflects the number of this setup in order list data 15B in data memory unit 15 (step S23).

Figure 10:
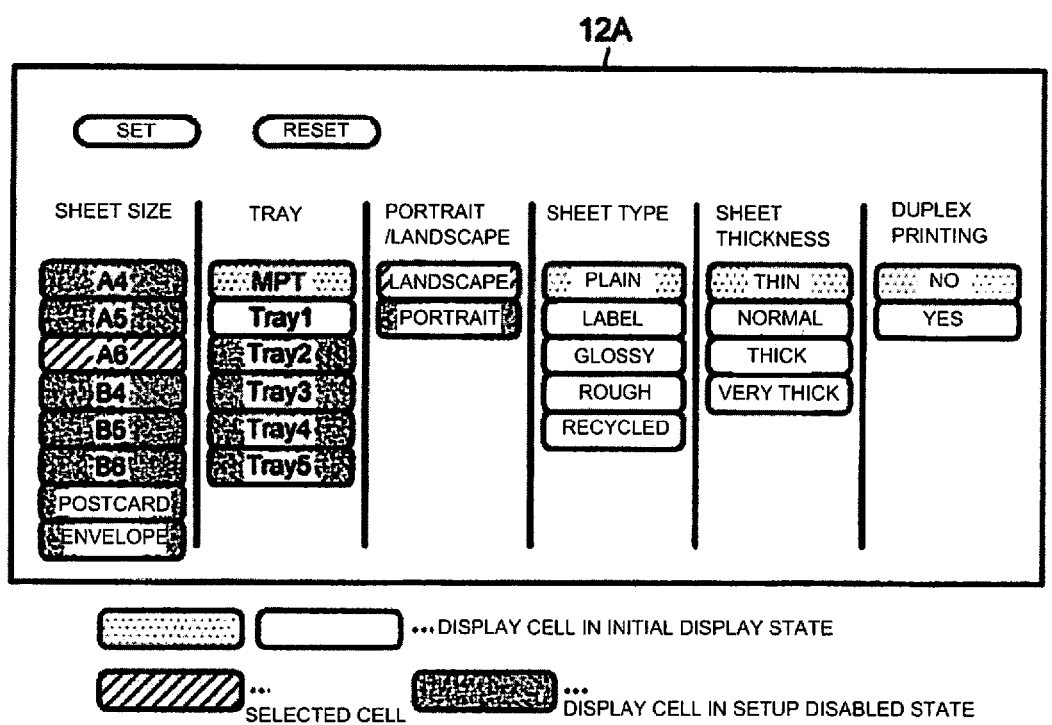
FIG. 10 is a view illustrating a setup screen displayed after an update performed when a user selects "A6" out of the display cells in FIG. 5.

Here, FIG. 10 is a view illustrating an example of setup screen 12A displayed after an update is performed when the user selects the display cell of "A6" out of the display cells (FIG. 5) in the initial display state. As illustrated in FIG. 10, the display state of the selected cell of "A6" is changed from the initial display state (state where the background color is white) to the setup effective state (step S21) while the display states of the other display cells corresponding to the same setup item ("sheet size") are changed from the initial display state (state where the background is white or hatched with halftone dots) to the setup disabled state (step S22). Moreover, since "sheet size" is the first setup item to be set, the number (first) of this setup is reflected in order list data 15B (step S23).

After executing step S23 described above, setup controller 22 finds the display cells having the conflicting relationships with the selected cell by searching the display cells belonging to the display item groups other than the display item group to which the selected cell belongs, on the basis of the conflict information illustrated in FIGS. 7 and 8. Then, setup controller 22 changes the display states of the found display cells from the initial display state to the setup disabled state (for example, the display state where the background is gray) (steps S24 to S28).

To be more specific, setup controller 22 determines whether there is an unset setup item (step S24) and terminates the selection process when there is no unset setup item (NO in step S24).

Meanwhile, when there are unset setup item (YES in step S24), setup controller 22 selects one of the unset setup items (step S25). Setup controller 22 targets on one display cell corresponding to the selected setup item, refers to the conflicting information illustrated in FIGS. 7 and 8, and executes determination (conflict determination) on whether the targeted display cell has the conflicting relationship with the selected cell (step S26). When setup controller 22 determines that the targeted display cell has no conflicting relationship (NO in step S27), setup controller 22 causes the process to proceed to step S29. Meanwhile, when setup controller 22 determines that the targeted display cell has the conflicting relationship (YES in step S27), display controller 23 changes the display state of the display cell determined to have the conflicting relationship to the setup disabled state (step S28).

In subsequent step S29, setup controller 22 determines whether the conflict determination is completed for all of the display cells corresponding to the selected setup item (step S29). When setup controller 22 determines that the conflict determination is not completed for all of the display cells (NO in step S29), setup controller 22 causes the process to return to step S26. At this time, setup controller 22 targets on another display cell not subjected to the conflict determination yet, refers to the conflict information illustrated in FIGS. 7 and 8, and executes the conflict determination of whether the targeted display cell has the conflicting relationship with the selected cell (step S26).

Here, in the example of FIG. 10, unset setup items such as "paper feed tray" exist immediately after the completion of setup of "sheet size" (YES in step S24). Hence, setup controller 22 selects the unset setup item of "paper feed tray" (step S25) and determines whether each of the display cells corresponding to "paper feed tray" has the conflicting relationship with the selected cell of "A6" (step S26). According to FIG. 7, setup controller 22 determines that "MPT" and "Tray 1" out of the display cells corresponding to "paper feed tray" have no conflicting relationships with the selected cell of "A6" while "Tray 2", "Tray 3", "Tray 4", and "Tray 5" have the conflicting relationships with the selected cell of "A6" (step S27). Accordingly, the display states of "MPT" and "Tray 1" are left as they are in the initial display state (NO in step S27) and the display states of the other display cells of "Tray 2", "Tray 3", "Tray 4" and "Tray 5" are changed to the setup disabled state (step S28).

When setup controller 22 determines that the conflict determination is completed for all of the display cells in step S29 described above (YES in step S29), setup controller 22 determines whether there are one or multiple settable display cells other than those in the setup disabled state in the display item group corresponding to the unset setup item selected in step S25 (or step S34) (step S30). When there is one settable display cell, display controller 23 changes the display state of this display cell to the setup effective state (for example, the display state in which the background is yellow) (step S31). Then, setup controller 22 registers the setup state of the setup item (step S32). Specifically, setup controller 22 sets the variable value of the setup item to the setup value assigned to this display cell, reflects this setup in setup state data 15A, and reflects the number of this setup in order list data 15B in data memory unit 15 (step S32). Thereafter, in a case where unselected and unset setup items are left (YES in step S33), setup controller 22 selects one of the unselected and unset setup item (step S34) and causes the process to proceed to step S26.

Here, in the example of FIG. 10, "landscape" is the only settable display cell out of the display cells corresponding to the unset setup item of "portrait/landscape". Accordingly, display controller 23 changes the display state of the display cell of "landscape" to the setup effective state and automatically sets the display cell of "landscape" as the selected cell (step S31). Moreover, since "portrait/landscape" is the second setup item to be set, the number (second) of this setup is reflected in order list data 15B (step S32).

Meanwhile, when setup controller 22 determines that there are multiple settable display cells in step S30 described above, setup controller 22 causes the process to proceed to step S24. In the example of FIG. 10, all of the display cells corresponding to the setup items of "sheet type", "sheet thickness", and "duplex printing" have no conflicting relationship with the selected cell of "A6" and setup controller 22 determines that there is no conflicting relationship in step S27. Accordingly, in step S30 described above, setup controller 22 determines that there are multiple settable display cells in each of "sheet type", "sheet thickness", and "duplex printing".

Eventually, in step S33, when setup controller 22 determines that there is no unselected and unset setup item left (NO in step S33), the selection process is terminated.

As described above, an action of the user simply selecting the display cell of "A6" once out of the display cells in the initial display state illustrated in FIG. 5 changes the display pattern of setup screen 12D in FIG. 5 to the display pattern of setup screen 12A in FIG. 10. Controller 21 continues to update the display pattern of the setup screen by executing the selection process illustrated in FIG. 9 every time the user selects any one of the display cells corresponding to the unset setup items.

Figure 11:
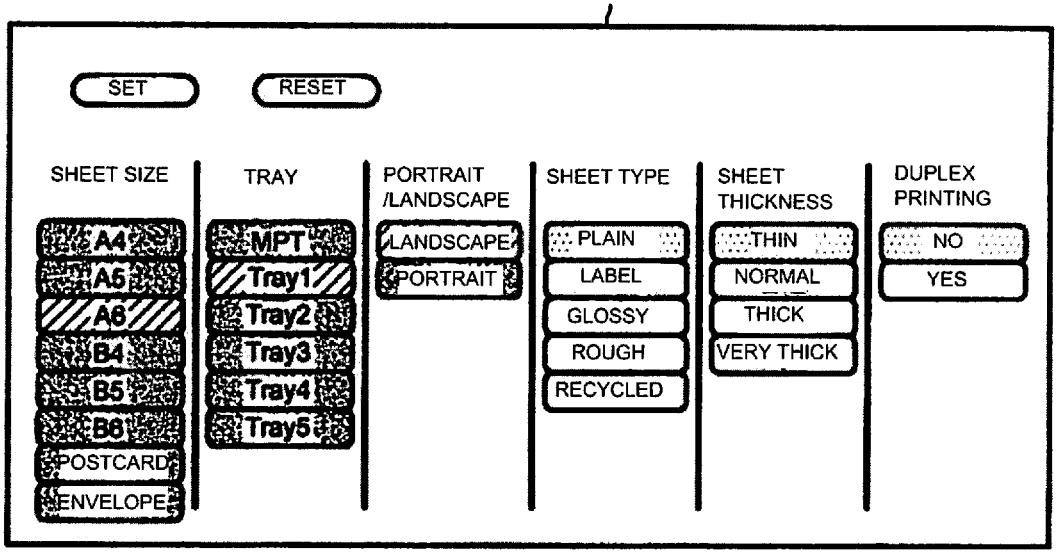
FIG. 11 is a view illustrating a setup screen displayed after an update performed when the user selects "Tray 1" in the setup screen of FIG. 10.

FIG. 11 is a view illustrating setup screen 12B displayed after an update is performed when the user selects the display cell of "Tray 1" in setup screen 12A of FIG. 10. In this case, the display state of the display cell of "Tray 1" is changed to the setup effective state (for example, the display state in which the background is yellow) (step S21 of FIG. 9), while the display state of "MPT" corresponding to the setup item of "paper feed tray" is changed to the setup disabled state (for example, the display state in which the background is gray) (step S22). Then, setup controller 22 sets the variable value of the setup item of "paper feed tray" to the setup value assigned to "Tray 1", reflects this setup in setup state data 15A, and reflects the number (third) of this setup in order list data 15B in data memory unit 15 (step S23).

Thereafter, setup controller 22 determines that there is no display cell having the conflicting relationship with the display cell of "Tray 1" in the display cells corresponding to the unset setup items of "sheet type", "sheet thickness", and "duplex printing", on the basis of the confliction information illustrated in FIGS. 7 and 8 (NO in step S27). Accordingly, in step S30, setup controller 22 determines that there are multiple settable display cells in each of "sheet type", "sheet thickness", and "duplex printing".

Figure 12:
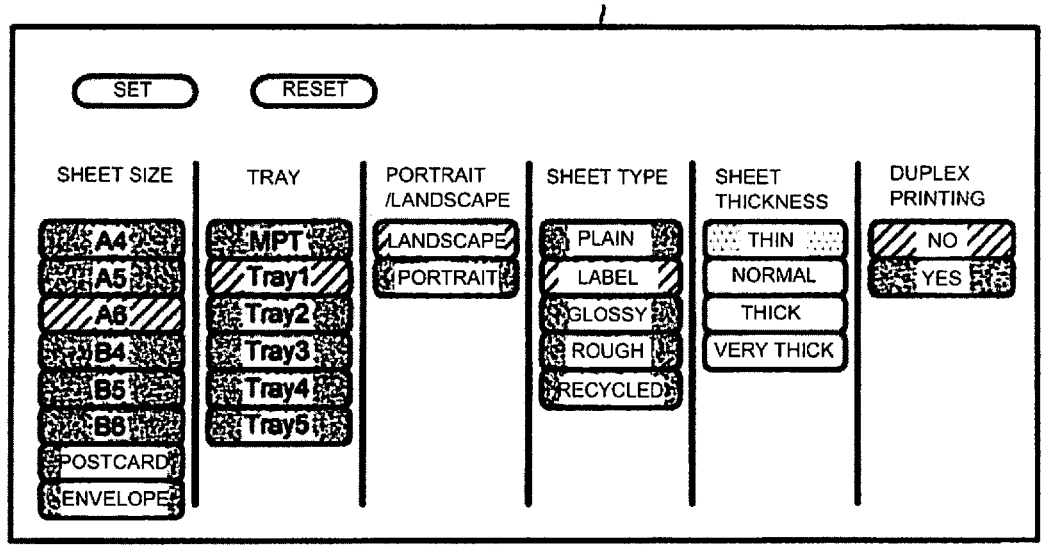
FIG. 12 is a view illustrating a setup screen displayed after an update performed when the user selects "label paper" in the setup screen of FIG. 11.

FIG. 12 is a view illustrating setup screen 12C displayed after an update is performed when the user selects the display cell of "label paper" in setup screen 12B of FIG. 11. In this case, the display state of "label paper" is changed to the setup effective state (for example, the display state in which the background is yellow) (step S21 of FIG. 9) while the display states of "plain paper", "glossy paper", "rough paper", and "recycled paper" corresponding to the setup item of "sheet type" are changed to the setup disabled state (for example, the display state in which the background is gray) (step S22). Then, setup controller 22 sets the variable value of the setup item of "sheet type" to the setup value assigned to "label paper", reflects this setup in setup state data 15A, and reflects the number (fourth) of this setup in order list data 15B in data memory unit 15 (step S23). Thereafter, the variable value of the setup item of "duplex printing" is set to the setup value assigned to "no" and the number (fifth) of this setup is reflected in order list data 15B in data memory unit 15 (step S32).

Figure 13:
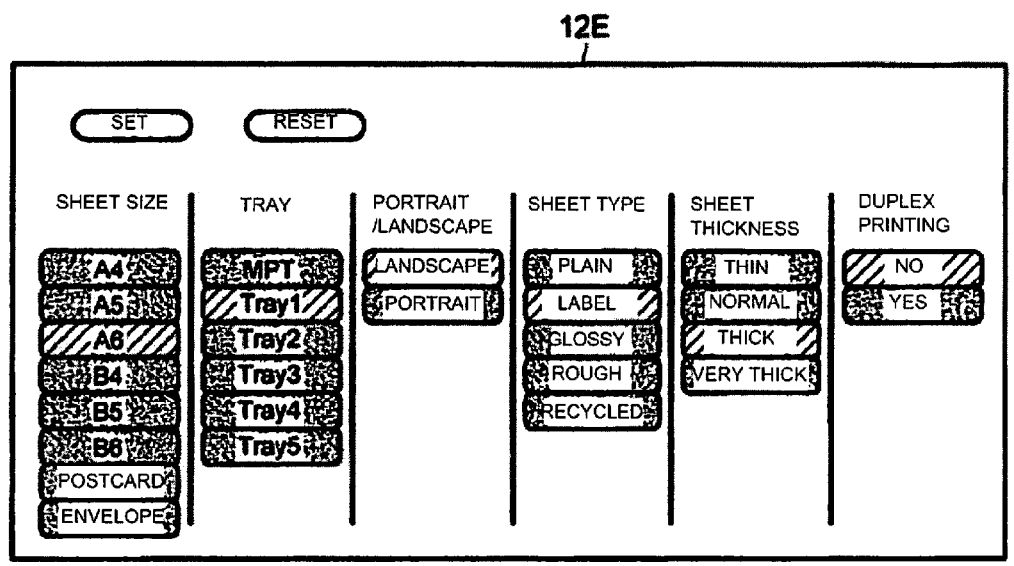
FIG. 13 is a view illustrating a setup screen displayed after an update performed when the user selects "thick" in the setup screen of FIG. 12.

FIG. 13 is a view illustrating setup screen 12E displayed after an update is performed when the user selects the display cell of "thick" in setup screen 12C of FIG. 12. In this case, the display state of "thick" is changed to the setup effective state (for example, the display state in which the background is yellow) (step S21 of FIG. 9) while the display states of "thin", "normal", and "very thick" corresponding to the setup item of "sheet thickness" are changed to the setup disabled state (for example, the display state in which the background is gray) (step S22). Then, the variable value of the setup item of "sheet thickness" is set to the setup value assigned to "thick" and the number (sixth) of this setup is reflected in order list data 15B in data memory unit 15 (step S32).

The setup items are set in the following order through the transition of setup screens 12D, 12A to 12C, 12E in FIGS. 5 and 10 to 13 described above.

First: "A6" regarding "sheet size"
Second: "landscape" regarding "portrait/landscape"
Third: "Tray 1" regarding "paper feed tray"
Fourth: "label paper" regarding "sheet type"
Fifth: no regarding "duplex printing"
Sixth: "thick" regarding "sheet thickness".

Figure 14:
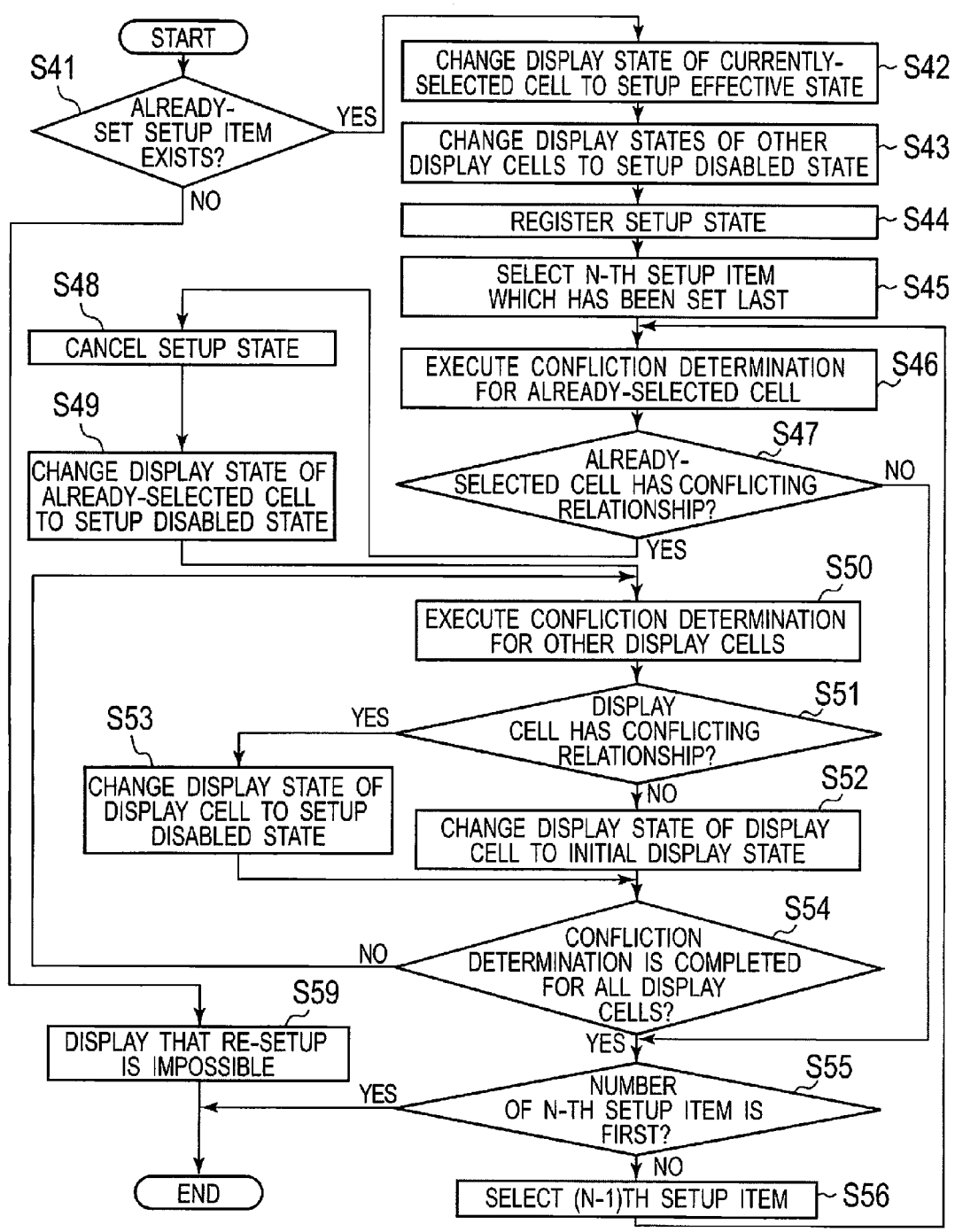
FIG. 14 is a flowchart schematically illustrating a procedure of a reselection process in Embodiment 1.

Next, the reselection process is described with reference to the flowchart of FIG. 14. FIG. 14 is a flowchart schematically illustrating a procedure of the reselection process.

When the user selects a display cell in the setup disabled state (for example, the display cell of "glossy paper" in setup screen 12C illustrated in FIG. 12) in a state where setup is not completed for all of the setup items or when the user selects a display cell in the setup disabled state (for example, the display cell of "glossy paper" in setup screen 12E in FIG. 13) in a state where setup is completed for all of the setup items, controller 21 having detected this operation input starts the reselection process.

Figure 15:
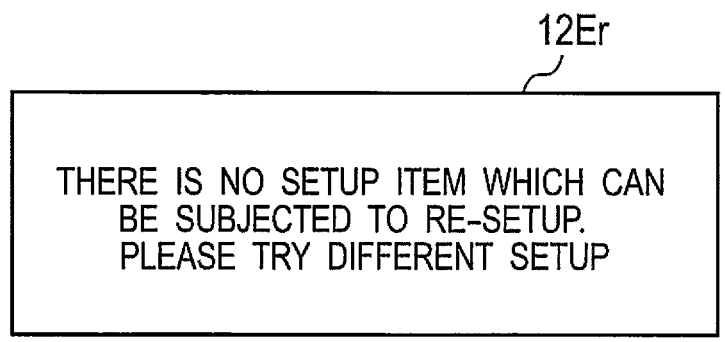
FIG. 15 is a view illustrating an example of a warning screen.

As illustrated in FIG. 14, when setup controller 22 refers to setup state data 15A and determines that there is no setup item which has been already set (NO in step S41), setup controller 22 displays a warning screen indicating that reselection is impossible on display unit 12 (step S59) and terminates the reselection process. FIG. 15 is a view illustrating an example of warning screen 12Er.

Meanwhile, when setup controller 22 determines that there is a setup item which has been already set (YES in step S41), display controller 23 changes the display state of a currently-selected display cell (hereafter, referred to as "currently-selected cell") to the setup effective state (for example, the display state in which the background is yellow) (step S42) and changes the display states of the other display cells corresponding to the same setup item to the setup disabled state (for example, the display state in which the background is gray) (step S43). Then, setup controller 22 registers the setup state of the setup item (step S44). Specifically, setup controller 22 sets the variable value of the setup item to the set value assigned to the currently-selected cell, reflects this setup in setup state data 15A, and reflects the number of this setup in order list data 15B in data memory unit 15 (step S44).

Figure 16:
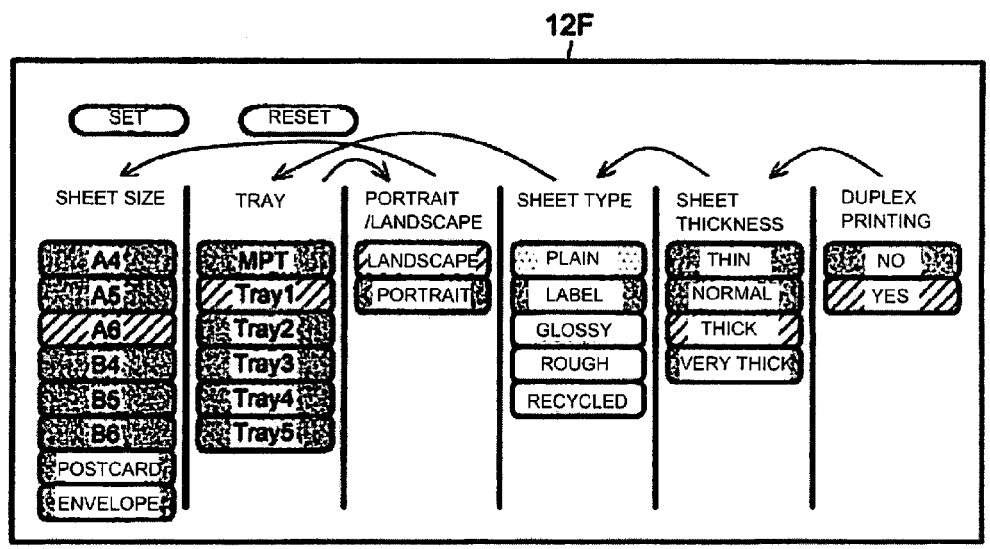
FIG. 16 is a view illustrating a setup screen displayed after an update performed when the user selects "yes" for "duplex printing" in the setup screen of FIG. 13.

FIG. 16 is a view illustrating setup screen 12F displayed after an update is performed when the user selects the display cell of "yes" for "duplex printing" in setup screen 12E illustrated in FIG. 13. As illustrated in FIG. 16, the display state of the currently-selected cell of "yes" is changed to the setup effective state (step S42) while the display state of the other display cell corresponding to the same setup item ("duplex printing") is changed to the setup disabled state (step S43). Moreover, the number to which "duplex printing" is set is reflected in order list data 15B (step S44). As a result, order list data 15B is updated to indicate the following order.

First: "A6" regarding "sheet size"
Second: "landscape" regarding "portrait/landscape"
Third: "Tray 1" regarding "paper feed tray"

Fourth: "label paper" regarding "sheet type"

Fifth: "thick" regarding "sheet thickness"

Sixth: "yes" regarding "duplex printing"

After the execution of step S44 described above, setup controller 22 selects the N-th (N is an integer equal to or greater than one) setup item which has been set last before the start of the reselection process (step S45). In the example of FIG. 16, the N-th setup item is "sheet thickness" which is a fifthly set up item.

Next, setup controller 22 executes a determination (confliction determination) on whether a selected cell (hereafter, referred to as already-selected cell) corresponding to the N-th setup item has the conflicting relationship with the currently-selected cell, on the basis of the confliction information illustrated in FIGS. 7 and 8 (step S46). When setup controller 22 determines that the already-selected cell has no conflicting relationship (NO in step S47), setup controller 22 causes the process to proceed to step S55.

In step S55, setup controller 22 refers to order list data 15B and determines whether the number of the N-th setup item is first. When the number of the N-th setup item is first (YES in step S55), the reselection process is terminated. Meanwhile, when the number of the N-th setup item is not first (NO in step S55), setup controller 22 refers to order list data 15B and selects a (N−1) th setup item which is one before the N-th setup item (step S56). Then, setup controller 22 causes the process to return to step S46.

In the example of FIG. 16, after the completion of re-setup of "duplex printing", "sheet thickness" which is the fifthly-set setup item is selected as illustrated by the arrow (step S56). Since the already-selected cell ("thick") corresponding to "sheet thickness" does not have the conflicting relationship with the currently-selected cell of "yes" (NO in step S47), "sheet type" which is the fourthly-set setup item is selected as illustrated by the arrow in FIG. 16 (No in step S55 and step S56).

When setup controller 22 determines that the already-selected cell has the conflicting relationship in step S47 described above (YES in step S47), setup controller 22 cancels the setup state of the setup item corresponding to the already-selected cell (step S48). Then, display controller 23 changes the display state of the already-selected cell to the setup disabled state (step S49).

Next, setup controller 22 executes a determination on whether the other display cells corresponding to the same setup item each have the conflicting relationship with the currently-selected cell (step S50). When setup controller 22 determines that the display cell has the conflicting relationship (YES in step S51), display controller 23 changes the display state of the display cell to the setup disabled state (step S53). Meanwhile, when setup controller 22 determines that the display cell has no conflicting relationship (NO in step S51), display controller 23 changes the display state of the display cell to the initial display state (step S52).

Thereafter, setup controller 22 determines whether the confliction determination is completed for all of the display cells corresponding to the set item (step S54). When the confliction determination is not completed for all of the display cells (NO in step S54), setup controller 22 causes the process to return to step S50 and executes the confliction determination for other display cells.

When setup controller 22 determines that the confliction determination is completed for all of the display cells in step S54 described above (YES in step S54), setup controller 22 causes the process to proceed to step S55. When the number of the N-th setup item is first (YES in step S55), the reselection process is terminated.

Here, in the example of FIG. 16, after the selection of the setup item of "sheet type" in step S56, since the already-selected cell of "label paper" in combination with "Tray 1" has the conflicting relationship with the currently-selected cell of "yes" (YES in step S47 of FIG. 8), the setup state of the setup item of "sheet type" is cancelled (step S48) and the display state of the already-selected cell ("label paper") is changed to the setup disabled state (step S49). Moreover, since each of the display cells of "plain paper", "glossy paper", "rough paper", and "recycled paper" corresponding to "sheet type" has no conflicting relationship with the currently-selected cell (NO in step S51), the display states of these display cells are changed to the initial display state (step S52). Similar processes are performed for the remaining setup items of "paper feed tray", "portrait/landscape", and "sheet size" in the order illustrated by the arrows of FIG. 16.

Figure 17:
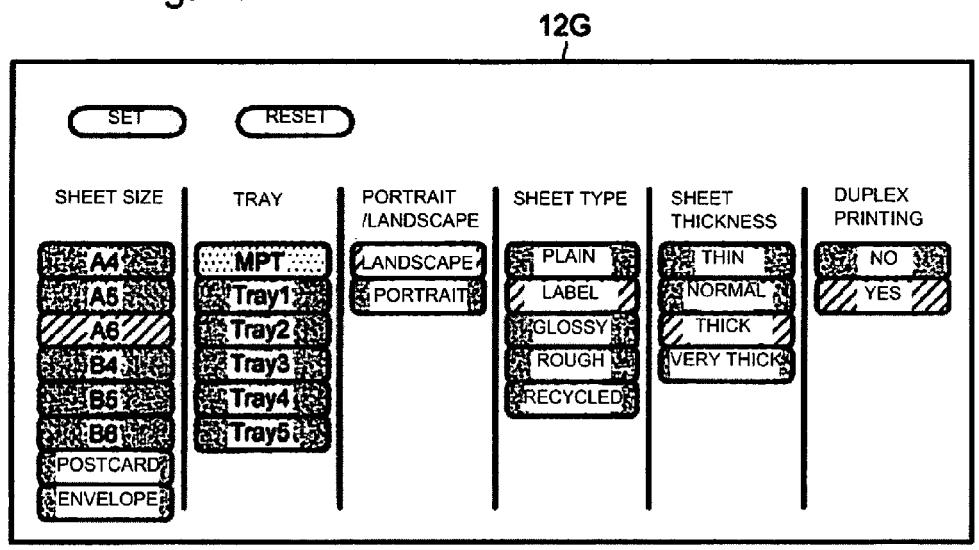
FIG. 17 is a view illustrating a setup screen displayed after an update performed when the user selects "label paper" in the setup screen of FIG. 16.
Figure 18:
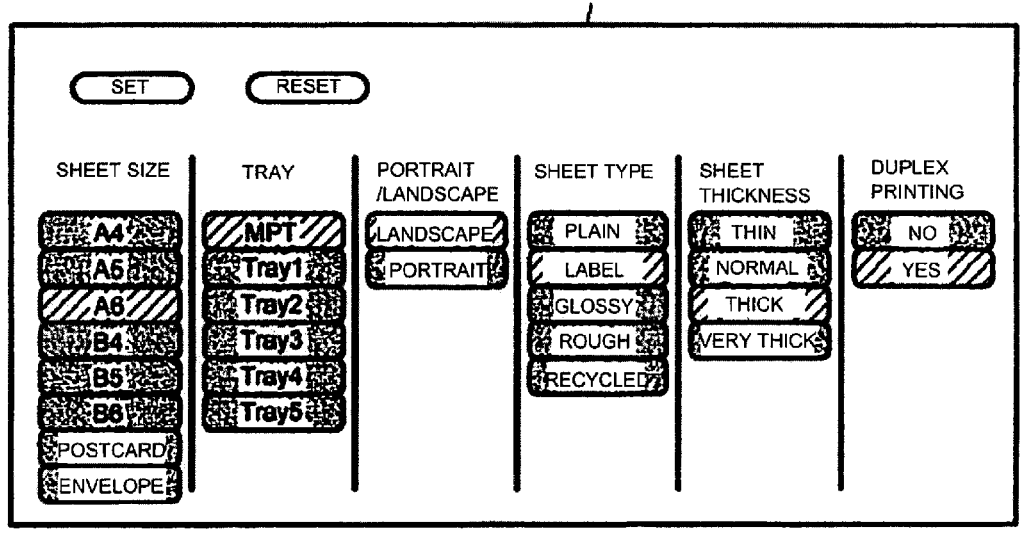
FIG. 18 is a view illustrating a setup screen displayed after an update performed when the user selects "MPT" in the setup screen of FIG. 17.

FIG. 17 is a view illustrating setup screen 12G displayed after an update is performed when the user selects the display cell of "label paper" in setup screen 12F illustrated in FIG. 16. In this case, controller 21 executes the reselection process illustrated in FIG. 14 and displays setup screen 12G on display unit 12. Moreover, FIG. 18 is a view illustrating setup screen 12H displayed after an update is performed when the user selects the display cell of "MPT" in setup screen 12G illustrated in FIG. 17. In this case, controller 21 executes the reselection process illustrated in FIG. 14 and displays setup screen 12H on display unit 12.

The user terminates the medium setup process described above by selecting the "set" button in the setup screen and dialog screen 12Z illustrated in FIG. 4 becomes operable.

As described above, in Embodiment 1, controller 21 displays the setup screen (for example, setup screen 12D illustrated in FIG. 5) on which a list of the display item groups corresponding respectively to the various setup items are displayed in a list form (for example, setup screen 12D illustrated in FIG. 5), on display unit 12. In response to the operation input instructing the selection of the display cell, controller 21 displays the setup screen (for example, setup screens 12A to 12C, 12E in FIGS. 10 to 13) on display unit 12 in a list form on the basis of confliction database 16B. The setup screen is a screen in which the selected cell specified by the user and the display cells having the conflicting relationships with the selected cells are easily identifiable. Accordingly, the user can complete the desired setup for the various setup items very easily in a short time.

Moreover, controller 21 displays the setup screen (for example, setup screens 12F to 12H in FIGS. 16 to 18) on display unit 12 in a list form on the basis of confliction database 16B. The setup screen is a screen in which the selected cell (currently-selected cell) specified by the user for the already-set setup item and the already-selected cells having the conflicting relationship with the selected cell are easily identifiable. Accordingly, the user can complete re-setup for the various setup items very easily in a short time. Moreover, controller 21 can efficiently perform re-setup of the various setup items in the reverse order to the setup order, on the basis of order list data 15B.

Embodiment 2

Figure 19:
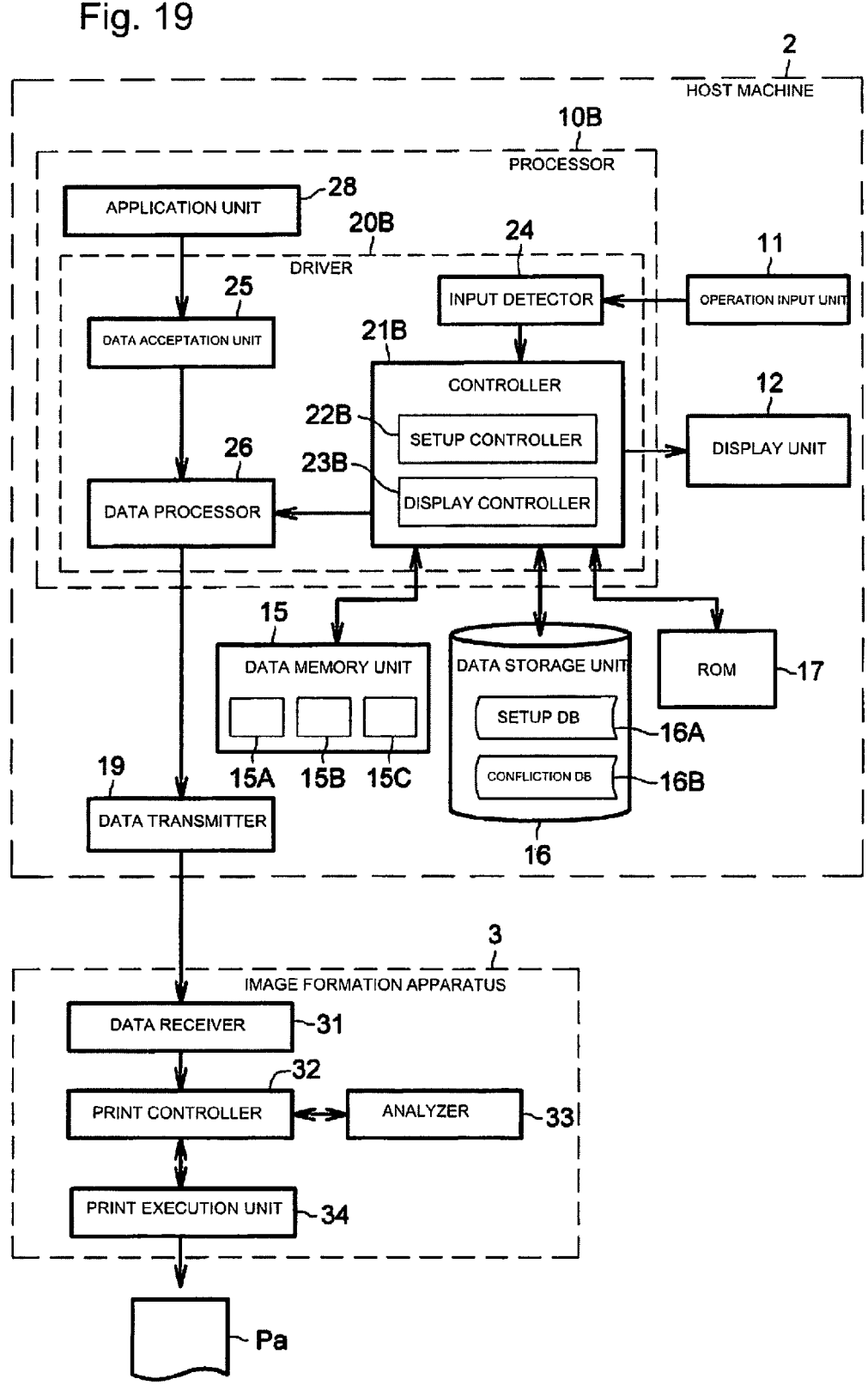
FIG. 19 is a block diagram illustrating a schematic configuration of a print system including: a host machine which is an information processing apparatus in Embodiment 2 of the invention; and an image formation apparatus.

Next, Embodiment 2 of the invention is described. FIG. 19 is a block diagram illustrating a schematic configuration of a print system including: host machine 2 which is an information processing apparatus in Embodiment 2 of the invention; and image formation apparatus 3. The configuration and operations of image formation apparatus 3 illustrated in FIG. 19 are the same as the configuration and operations of image formation apparatus 3 illustrated in FIG. 1.

The configuration of host machine 2 in the embodiment is the same as the configuration of host machine 1 in Embodiment 1 described above, except for processor 10B. Moreover, the configuration of processor 10B is the same as the configuration of processor 10 in Embodiment 1 described above, except for the point that processor 10B includes driver 20B instead of driver 20 illustrated in FIG. 1. Furthermore, the configuration of driver 20B in the embodiment is the same as the configuration of driver 20 in Embodiment 1 described above, except for the point that driver 20B includes controller 21B instead of controller 21 illustrated in FIG. 1.

As illustrated in FIG. 19, controller 21B in the embodiment includes setup controller 22B and display controller 23B. Setup controller 22B has the same function as the function of setup controller 22 in Embodiment 1 described above. Display controller 23B has the same function as the function of display controller 23 in Embodiment 1 described above and also has the following function. When the operation input instructing a selection of the display item (display cell) in the setup effective state described above is detected, display controller 23B changes the display state of the selected display item (selected cell) to a re-setup disabled display state (for example, a display state in which the background is red). Setup controller 22B reflects this state in setup state fixation data 15C in data memory unit 15. The user can reset the re-setup disabled display state to an original display state by selecting the cell set to the re-setup disabled display state again.

Figure 20:
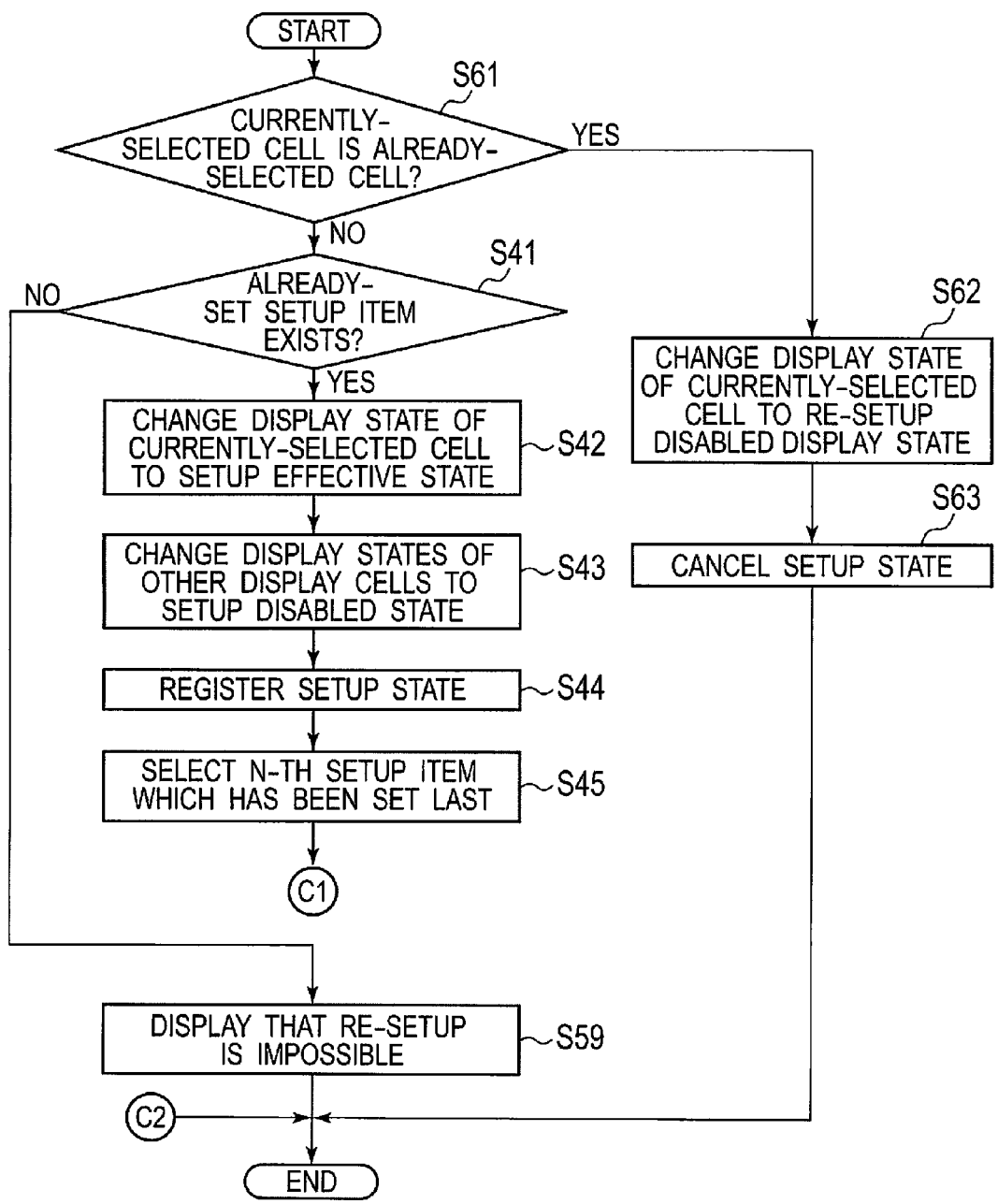
FIG. 20 is a flowchart schematically illustrating a procedure of a reselection process in Embodiment 2.
Figure 21:
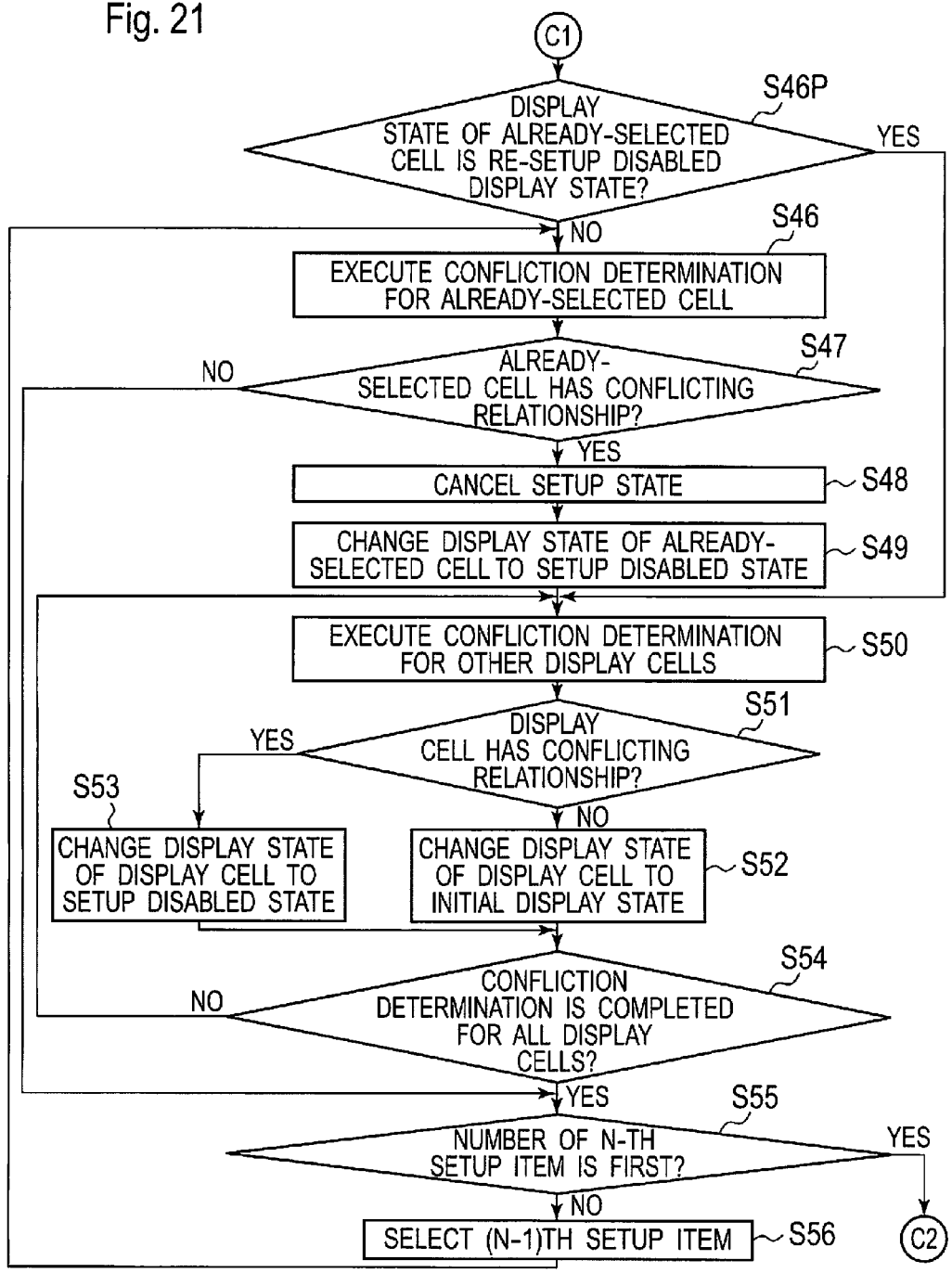
FIG. 21 is another flowchart schematically illustrating the procedure of the reselection process in Embodiment 2.

FIGS. 20 and 21 are flowcharts schematically illustrating a procedure of a reselection process in Embodiment 2. The flowcharts of FIGS. 20 and 21 are connected to each other via connectors C1, C2.

When the user selects the display cell in the setup effective state (for example, the display cell of "label paper" in setup screen 12H illustrated in FIG. 18), controller 21B having detected this operation input starts the reselection process.

As illustrated in FIG. 20, display controller 23B determines whether the currently-selected display cell (hereafter referred to as "currently-selected cell") is a display cell having been selected before (hereafter, referred to as "already-selected cell") (step S61). When the currently-selected cell is the already-selected cell (YES in step S61), display controller 23B changes the display state of the currently-selected cell to the re-setup disabled display state (step S62). Moreover, setup controller 22B cancels the setup state of the setup item corresponding to the currently-selected cell (step S63) and reflects the fact that the display state of the currently-selected cell is fixed to the re-setup disabled display state, in setup state fixation data 15C.

Meanwhile, when the currently-selected cell is not the already-selected cell (NO in step S61), processes of step S41 and steps subsequent thereto are executed. The processes of step S41 and steps subsequent thereto are the same as the processes of step S41 and steps subsequent thereto in the reselection process of Embodiment 1 described above, except for step S46P in FIG. 21.

In step S46P, display controller 23B refers to setup state fixation data 15C and determines whether the display state of the already-selected cell is the re-setup disabled display state. When the display state of the already-selected cell is the re-setup disabled display state (YES in step S46P), the process proceeds to step S50. When the display state of the already-selected cell is not the re-setup disabled display state (NO in step S46P), the process proceeds to step S46.

Figure 22:
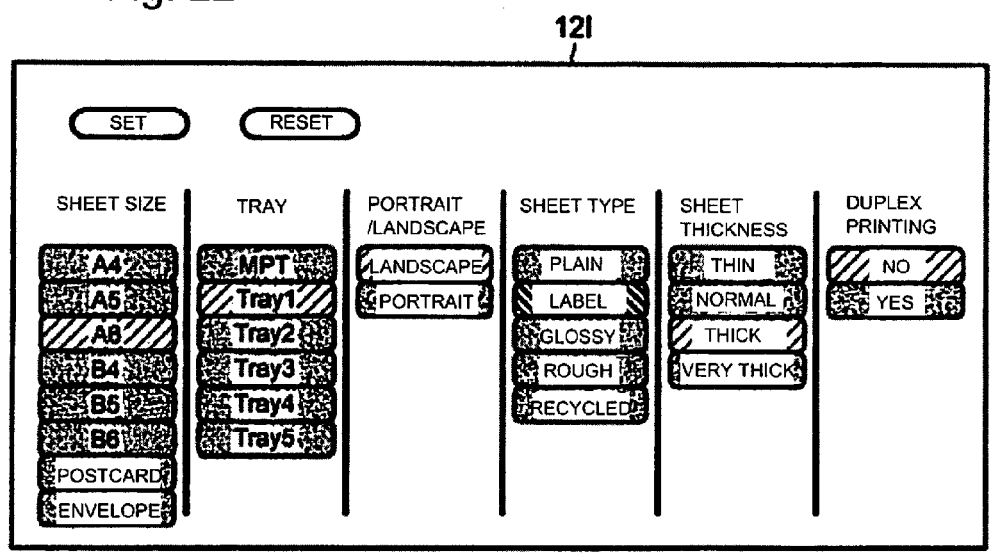
FIG. 22 is a view illustrating a setup screen displayed after an update performed when the user selects "label paper" in the setup screen of FIG. 18.

FIG. 22 is a view illustrating setup screen 12I displayed after an update is performed when the user selects the display cell of "label paper" in setup screen 12H illustrated in FIG. 18. The display state of the display cell of "label paper" is set to the re-setup disabled display state. In this case, the display state of the display cell of "label paper" is fixed and this state is reflected in setup state fixation data 15C. Note that an action of the user selecting the display cell of "label paper" again can cancel the fixed display state.

Figure 23:
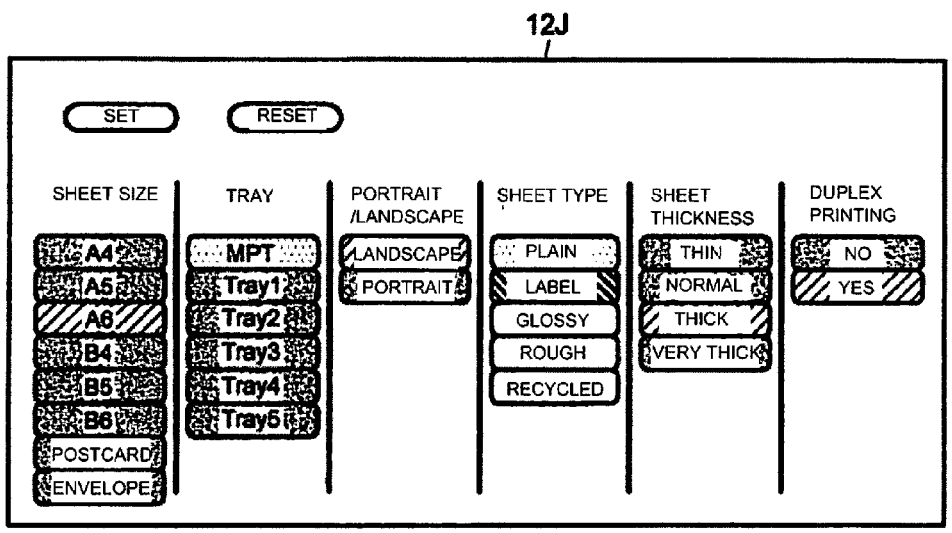
FIG. 23 is a view illustrating a setup screen displayed after an update performed when the user selects "yes" for "duplex printing" in the setup screen of FIG. 22.
Figure 24:
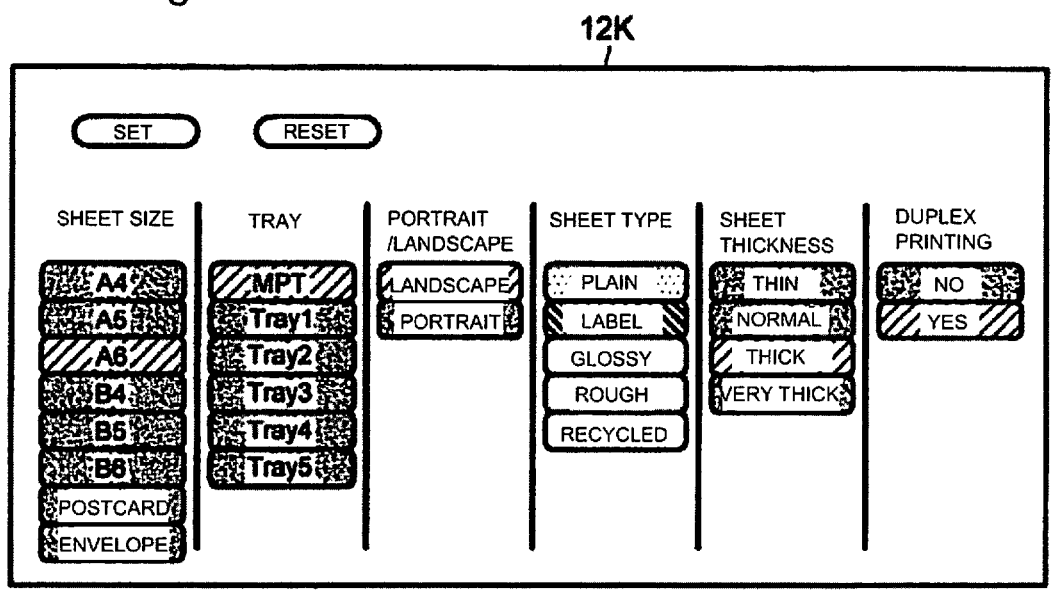
FIG. 24 is a view illustrating a setup screen displayed after an update performed when the user selects "MPT" in the setup screen of FIG. 23.

FIG. 23 is a view illustrating setup screen 12J displayed after an update is performed when the user selects the display cell of "yes" corresponding to "duplex printing" in setup screen 12I illustrated in FIG. 22. Furthermore, FIG. 24 is a view illustrating setup screen 12K displayed after an update is performed when the user selects the display cell of "MPT" in setup screen 12J illustrated in FIG. 23.

As described above, in Embodiment 2, when re-setup of the setup items in the conflicting relationship to each other is to be performed in a reverse order to the order of the setup, determining, in advance, the display cell which is not the target of the re-setup can prevent unintended re-setup of the display cell. Accordingly, easy re-setup can be executed in fewer procedures.

Embodiment 3

Figure 25:
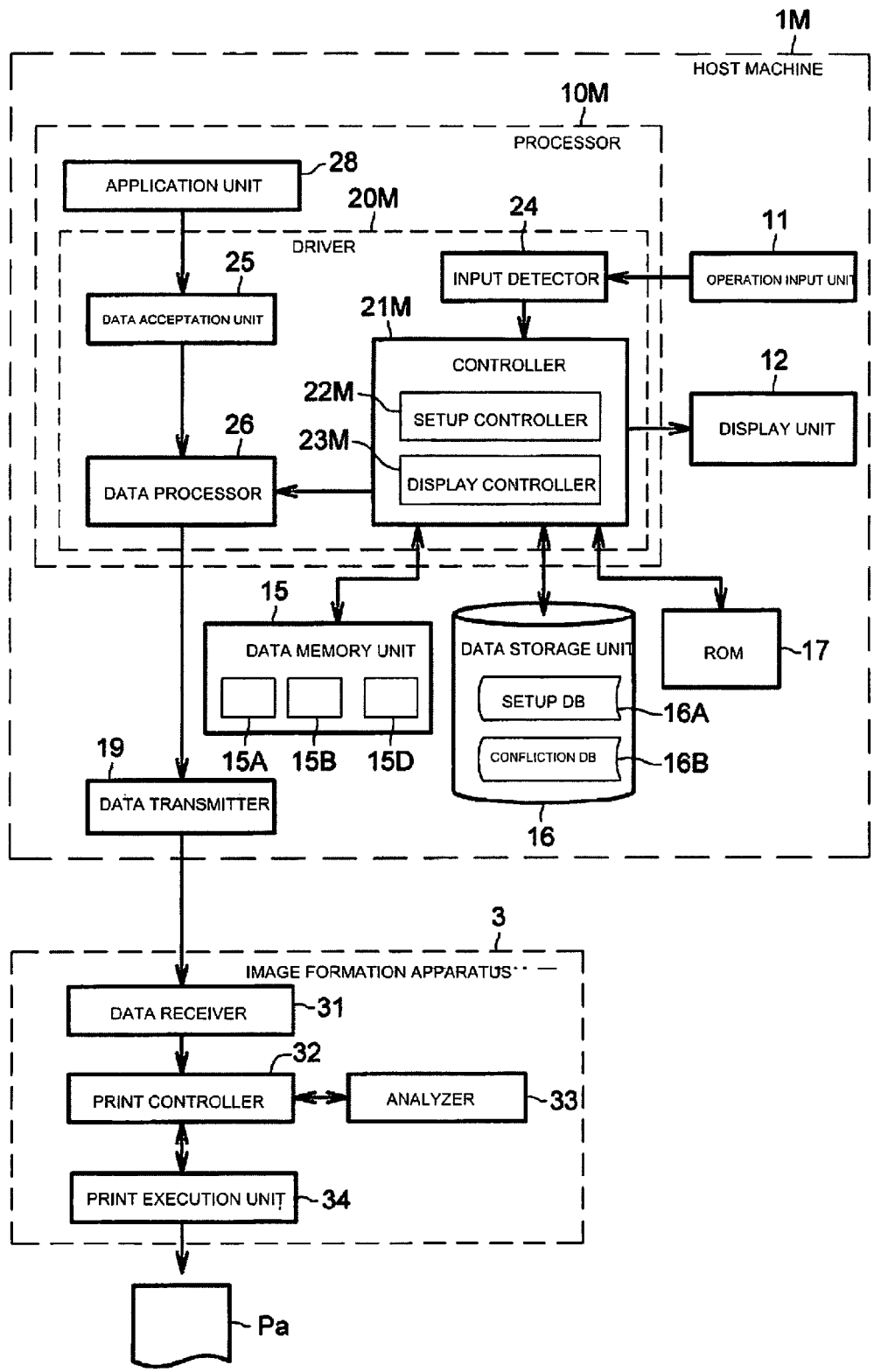
FIG. 25 is a block diagram illustrating a schematic configuration of a print system including: a host machine which is an information processing apparatus in Embodiment 3 of the invention; and an image formation apparatus.

Next, Embodiment 3 of the invention is described. FIG. 25 is a block diagram illustrating a schematic configuration of a print system including: host machine 1M which is an information processing apparatus in Embodiment 3 of the invention; and image formation apparatus 3. The configuration and operations of image formation apparatus 3 illustrated in FIG. 25 are the same as the configuration and operations of image formation apparatus 3 illustrated in FIG. 1.

The configuration of host machine 1M in the embodiment is the same as the configuration of host machine 1 in Embodiment 1 described above, except for processor 10M. Moreover, the configuration of processor 10M is the same as the configuration of processor 10 in Embodiment 1 described above, except for the point that processor 10M includes driver 20M instead of driver 20 illustrated in FIG. 1. Furthermore, the configuration of driver 20M in the embodiment is the same as the configuration of driver 20 in Embodiment 1 described above, except for the point that driver 20M includes controller 21M instead of controller 21 illustrated in FIG. 1.

As illustrated in FIG. 25, controller 21M in the embodiment includes setup controller 22M and display controller 23M. Setup controller 22M has the same function as the function of setup controller 22 described above and also has a function of generating history data 15D indicating the history of change in the display states of the display items (display cells) described above and storing history data 15D in data memory unit 15.

Meanwhile, display controller 23M has the same function as the function of display controller 23 described above and also has a function of displaying each of the display cells on display unit 12 in a form in which a past display state is recognizable, on the basis of history data 15D.

FIGS. 26A and 26B are views illustrating setup screen 12Gm displayed before and after an update is performed when the user selects the display cell of "label paper" in setup screen 12F illustrated in FIG. 16. In setup screen 12Gm, for example, an upper portion of the display cell of "label paper" is displayed in the setup disabled state which is the display state before the update and which is the past display state. A lower portion of the display cell of "label paper" is displayed in the setup effective state which is the display state after the update. Moreover, an upper portion of the display cell of "MPT" is displayed in the setup disabled state which is the display state before the update and which is the past display state, while a lower portion of the display cell of "MPT" is displayed in the initial display state which is the display state after the update.

Figure 27A:
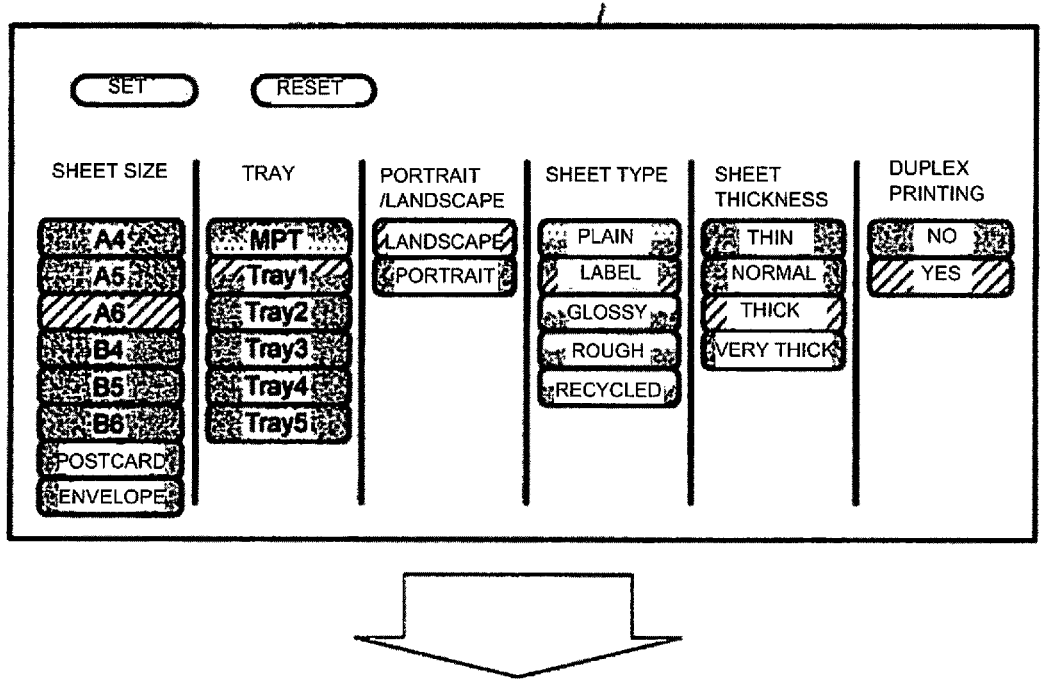
FIGS. 27A and 27B are views illustrating a setup screen displayed before and after an update performed when the user selects "MPT" in the setup screen of FIGS. 26A and 26B.
Figure 27B:
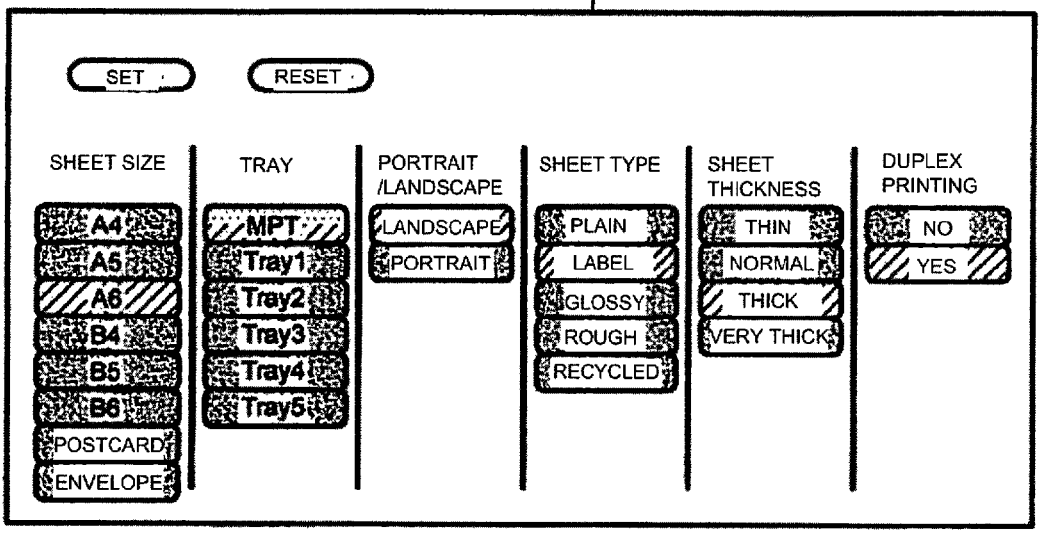

FIGS. 27A and 27B are views illustrating setup screen 12Hm displayed before and after an update is performed when the user selects the display cell of "MPT" in setup screen 12Gm illustrated in FIGS. 26A and 26B. In setup screen 12Hm, for example, the upper portion of the display cell of "MPT" is displayed in the initial display state which is the display state before the update and which is the past display state. The lower portion of the display cell of "MPT" is displayed in the setup effective state which is the display state after the update. Moreover, the display cell of "label paper" is displayed entirely only in the setup effective state.

As described above, display controller 23M displays each of the display cells on display unit 12 in a form in which the past display state is recognizable. Accordingly, the user can recognize and distinguish the current setup state and the setup state before the update and thereby perform current setup while checking the setup state before the update. Hence, an effect of improved usability is obtained.

Various embodiments of the invention are described above with reference to the drawings. However, these embodiments are examples of the invention and various embodiments other than those described above can be employed. For example, although Embodiments 1 to 3 described above are examples in which the invention is applied to image formation apparatus 3, the invention is not limited to this. The invention can be applied to any apparatus or software having a function of setting various setup items in a conflicting relationship to each other.

Moreover, although image formation apparatus 3 described above has the direct transfer method configuration, the invention is not limited to this. For example, the invention can be applied to an apparatus which forms a color developer image on a printing medium in an intermediate transfer method. Note that the intermediate transfer method is a method in which a developer image formed on an image carrier, such as a photosensitive body, is once transferred onto an intermediate transfer body (first transfer) and is then transferred from the intermediate transfer body to a recording medium (second transfer).

Moreover, the invention can be applied not only to a printer but also to a copier and a facsimile machine. Moreover, image formation apparatus 3 may be a MFP (Multi-Function Peripheral) having a scan function of reading a document image. In this case, in image formation apparatus 3, cumbersomeness of checking setup states in copying of the document image can be reduced by displaying a setup screen showing the conflicting relationship on display unit 12 in a list form and allowing the user to select a display cell in the setup screen. Note that, the MFP is an image formation apparatus having multiple functions of a copier, a printer, an image scanner, a facsimile machine, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An information processing apparatus configured to provide a user interface for setting various setup items related to a predetermined function, the information processing apparatus comprising:
a display controller configured to generate a setup screen in which display item groups corresponding respectively to the various setup items and each including display items are displayed;
a display unit configured to display the setup screen;
a setup controller configured to detect an operation input instructing a selection of one display item belonging to a certain one of the display item groups; and
a data storage unit configured to store confliction information defining a conflicting relationship of setup values not allowed to be set simultaneously between the various setup items, wherein
upon detection of the operation input, the setup controller finds a conflicting display item having the conflicting relationship with the selected one display item from the display item groups on the basis of the confliction information, and
the display controller changes the display state of the conflicting display item found by the setup controller to a conflicting display state, and
when the setup controller detects an operation input instructing a selection of the conflicting display item displayed in the conflicting display state, the display controller accepts the operation input of selecting the conflicting display item displayed in the conflicting display state.

2. The information processing apparatus according to claim 1, wherein, when the setup controller detects the operation input instructing the selection of the conflicting display item displayed in the conflicting display state, the display controller finds another conflicting display item having the conflicting relationship with the selected conflicting display item from the display item groups on the basis of the stored conflicting information, and the display controller changes the display state of the another conflicting display item to a conflicting display state.

3. The information processing apparatus according to claim 2, wherein upon detection of the operation input, the setup controller finds the display item having the conflicting relationship with the one display item as the conflicting display item by searching the display item group other than the certain display item group and sets the setup item corresponding to the certain display item group to a setup value assigned to the one display item.

4. The information processing apparatus according to claim 2, wherein
upon detection of the operation input instructing selection of an ineffective display item in the conflicting display state in the display item groups, the setup controller is configured to cancel a current setup state of one of the setup items which corresponds to an ineffective display item in the conflicting display state, select the display item belonging to the display item group other than the display item group to which the ineffective display item belongs, and determine whether the selected display item has the conflicting relationship with the ineffective display item on the basis of the confliction information, and
upon detection of the operation input instructing selection of the ineffective display item, the display controller is configured to change the display state of the ineffective display item to a setup effective state and change the display state of the display item determined to have the conflicting relationship by the setup controller to the conflicting display state.

5. The information processing apparatus of claim 4, further comprising a data memory unit configured to store order data indicating an order in which the setup items are set, wherein
upon detection of the operation input instructing selection of the conflicting display item, the setup controller is configured to select the display items belonging to the display item group other than the display item group to which the conflicting display item belongs, in a reverse order to the order in which the setup items are set, on the basis of the order data, and determine whether each of the display items selected in the reverse order has the conflicting relationship with the conflicting display item.

6. The information processing apparatus according to claim 4, further comprising a data memory unit configured to store history data indicating history of change in the display state of each of the display items, wherein
the display controller is configured to display each of the display items in a form in which a past display state of the display item is a recognizable, on the basis of the history data.

7. The information processing apparatus according to claim 2, wherein, upon detection of the operation input instructing selection of an effective display item in a setup effective state in the display item groups, the display controller is configured to change the display state of the effective display item to a re-conflicting display state.

8. The information processing apparatus according to claim 2, wherein a setup effective state and the conflicting display state are shown with background colors different from each other.

9. The information processing apparatus according to claim 2, further comprising a processor configured to generate data to be outputted to an external device having the predetermined function, by executing information processing according to a combination of the setup values set respectively for the various setup items.

10. The information processing apparatus according to claim 2, wherein the predetermined function is an image formation function of forming a print image on a medium.

11. The information processing apparatus according to claim 1, wherein, upon detection of the operation input instructing the selection of the conflicting display item, the setup controller is configured to select the display items belonging to the display item group other than the display item group to which the conflicting display item belongs, in a reverse order to an order in which the setup items are set, and determines whether each of the display items selected in the reverse order has the conflicting relationship with the conflicting display item.

12. The information processing apparatus according to claim 1, wherein the display controller is configured to display each of the display items in a form in which a past display state of the display item is recognizable, on the basis of history data indicating history of change in the display state of each of the display items.

13. A computer-implemented function setup method of providing a user interface for setting various setup items related to a predetermined function, the function setup method comprising:
generating a setup screen in which display item groups corresponding respectively to the various setup items and each including display items are displayed;
detecting an operation input instructing a selection of one display item belonging to a certain one of the display item groups;
accessing a data storage unit storing confliction information defining a conflicting relationship of setup values not allowed to be set simultaneously between the setup items, and finding a conflicting display item having the conflicting relationship with the one display item from the display item groups on the basis of the confliction information; and
changing the display state of the found conflicting display item to a conflicting display state, and
upon detecting an operation input instructing a selection of the conflicting display item displayed in the conflicting display state, accepting the operation input of selecting the conflicting display item displayed in the conflicting display state.

14. The computer-implemented function setup method according to claim 13, further comprising, upon detection of the operation input, setting the setup item corresponding to the certain display item group to the setup value assigned to the one display item, wherein
the conflicting display item is found by searching the display item group other than the certain display item group.

15. The computer-implemented function setup method according to claim 13, further comprising:
upon detection of the operation input instructing selection of an ineffective display item in the conflicting display state in the display item groups, cancelling a current setup state of one of the setup items which corresponds to the ineffective display item;
selecting the display item belonging to the display item group other than the display item group to which the ineffective display item belongs, and determining whether the selected display item has the conflicting relationship with an ineffective display item on the basis of the confliction information;
upon detection of the operation input instructing selection of the ineffective display item, changing the display state of the ineffective display item to a setup effective state; and
changing the display state of the display item determined to have the conflicting relationship to the conflicting display state.

16. The computer-implemented function setup method according to claim 15, further comprising
storing order data in a data memory unit, the order data indicating an order in which the setup items are set; and
upon detection of the operation input instructing selection of the conflicting display item, selecting the display items belonging to the display item group other than the display item group to which the conflicting display item belongs, in a reverse order to the order in which the setup items are set, on the basis of the order data, and determining whether each of the display items selected in the reverse order has the conflicting relationship with the conflicting display item.

17. The computer-implemented function setup method according to claim 13, further comprising, upon detection of the operation input instructing a selection of an effective display item in a setup effective state in the display item groups, changing the display state of the effective display item to a re-conflicting display state.

18. A non-transitory computer-readable medium storing a computer program configured to provide a user interface by causing a processor to execute a function setup process for setting various setup items related to a predetermined function, the computer program being executed by the processor by being read from a computer readable recoding medium, the function setup process including:
- a process of generating a setup screen in which display item groups corresponding respectively to the various setup items and each including display items are displayed in a list form;
- a process of detecting an operation input instructing selection of one display item belonging to a certain one of the display item groups;
- a process of accessing a data storage unit storing confliction information defining a conflicting relationship of setup values not allowed to be set simultaneously between the various setup items, and finding a conflicting display item having the conflicting relationship with the one display item from the display item groups on the basis of the confliction information; and
- a process of changing the display state of the found conflicting display item to a conflicting display state, and
- a process of, upon detecting an operation input instructing a selection of the conflicting display item displayed in the conflicting display state, accepting the operation input of selecting the conflicting display item displayed in the conflicting display state.

19. The non-transitory computer readable medium according to claim 18, wherein
the function setup process further includes a process of, upon detection of the operation input, setting the setup item corresponding to the certain display item group to the setup value assigned to the one display item, and
the conflicting display item is found by searching the display item group other than the certain display item group.

20. The non-transitory computer readable medium according to claim 18, wherein the function setup process further includes:
- a process of, upon detection of the operation input instructing a selection of an ineffective display item in the conflicting display state in the display item groups, cancelling a current setup state of one of the setup items which corresponds to the ineffective display item;
- a process of selecting the display item belonging to the display item group other than the display item group to which an ineffective display item belongs and determining whether the selected display item has the conflicting relationship with the ineffective display item on the basis of the confliction information;
- a process of, upon detection of the operation input instructing selection of the ineffective display item, changing the display state of the ineffective display item to a setup effective state; and
- a process of changing the display state of the display item determined to have the conflicting relationship to the conflicting display state.

21. The non-transitory computer readable medium according to claim 20, wherein the function setup process further includes:
- a process of storing order data in a data memory unit, the order data indicating an order in which the setup items are set; and
- a process of, upon detection of the operation input instructing selection of the conflicting display item, selecting the display items belonging to the display item group other than the display item group to which the conflicting display item belongs, in a reverse order to the order in which the setup items are set, on the basis of the order data, and determining whether each of the display items selected in the reverse order has the conflicting relationship with the conflicting display item.

22. The non-transitory computer readable medium according to claim 18, wherein the function setup process further includes a process of, upon detection of the operation input instructing selection of an effective display item in a setup effective state in the display item groups, changing the display state of the effective display item to a re-conflicting display state.

* * * * *